US012231808B2

(12) United States Patent
Yang et al.

(10) Patent No.: US 12,231,808 B2
(45) Date of Patent: Feb. 18, 2025

(54) INFORMATION TRANSMISSION METHOD AND RELATED DEVICE

(71) Applicant: HUAWEI TECHNOLOGIES CO., LTD., GuangDong (CN)

(72) Inventors: Jingming Yang, Shenzhen (CN); Yao Yao, Shenzhen (CN); Jian Chen, Shanghai (CN); Zhiyu Tang, Beijing (CN); Zhicheng Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 138 days.

(21) Appl. No.: 17/889,910

(22) Filed: Aug. 17, 2022

(65) Prior Publication Data
US 2022/0394211 A1 Dec. 8, 2022

Related U.S. Application Data

(63) Continuation of application No. PCT/CN2020/075778, filed on Feb. 18, 2020.

(51) Int. Cl.
*H04N 7/14* (2006.01)
*G06F 13/42* (2006.01)

(52) U.S. Cl.
CPC ........... *H04N 7/14* (2013.01); *G06F 13/4282* (2013.01); *G06F 2213/0042* (2013.01)

(58) Field of Classification Search
None
See application file for complete search history.

(56) References Cited

U.S. PATENT DOCUMENTS 6,862,285 B1 * 3/2005 Jeffrey .................... H04L 61/00
370/395.3
9,185,245 B2 * 11/2015 Miyachi ............. H04N 1/00347
(Continued)

FOREIGN PATENT DOCUMENTS

| CN | 101369979 A | 2/2009 |
| CN | 101634677 A | 1/2010 |

(Continued)

OTHER PUBLICATIONS

Gao Dong fei et al., Realization of Virtual Network Card Program Based on RNDIS Protocol, Computer Technology and Development, Feb. 2013, with an English abstract total 4 pages.
(Continued)

*Primary Examiner* — Henry Tsai
*Assistant Examiner* — Christopher A Bartels
(74) *Attorney, Agent, or Firm* — Rimon PC

(57) ABSTRACT

An information transmission method is provided, including: A control device obtains a second universal serial bus video class UVC port and a second virtual network port based on configuration of a universal serial bus USB port of the control device. The control device determines address information of a camera device, where a first UVC port and a first virtual network port are configured on the camera device, and the first UVC port and the first virtual network port are obtained based on configuration of a USB port of the camera device. The control device sends the address information to the camera device through a UVC channel, where the UVC channel is established based on the first UVC port and the second UVC port.

20 Claims, 13 Drawing Sheets

(56) References Cited

U.S. PATENT DOCUMENTS

| | | | |
|---|---|---|---|
| 9,817,732 B1* | 11/2017 | Fair | G06F 11/2007 |
| 10,289,816 B1* | 5/2019 | Malassenet | G06F 21/14 |
| 11,301,547 B1* | 4/2022 | Malassenet | G06F 21/14 |
| 11,483,591 B2* | 10/2022 | Auyeung | H04N 19/186 |
| 2010/0185795 A1 | 7/2010 | Chen et al. | |
| 2012/0047277 A1* | 2/2012 | Keidar | H04L 65/65 |
| | | | 348/731 |
| 2017/0214807 A1* | 7/2017 | Pring | H04L 69/04 |
| 2019/0042974 A1* | 2/2019 | Daraeizadeh | G06N 7/01 |
| 2021/0026555 A1* | 1/2021 | Zang | G06F 3/0679 |
| 2021/0092069 A1* | 3/2021 | Musleh | H04L 47/2441 |
| 2022/0191553 A1* | 6/2022 | Auyeung | H04N 19/436 |
| 2022/0331550 A1* | 10/2022 | Yang | A61F 9/04 |
| 2023/0206104 A1* | 6/2023 | Rab | G06N 10/40 |
| | | | 716/100 |

FOREIGN PATENT DOCUMENTS

| | | |
|---|---|---|
| CN | 102176704 A | 9/2011 |
| CN | 102256105 A | 11/2011 |
| CN | 103501356 A | 1/2014 |
| CN | 104699650 A | 6/2015 |
| CN | 105426194 A | 3/2016 |
| CN | 105589506 A | 5/2016 |
| CN | 106961580 A | 7/2017 |
| CN | 108255749 A | 7/2018 |
| CN | 108494639 A | 9/2018 |
| CN | 109640056 A | 4/2019 |
| CN | 109885511 A | 6/2019 |
| KR | 20130067520 A | 6/2013 |

OTHER PUBLICATIONS

ITU-T H.264(Jun. 2019), Series H: Audiovisual and Multimedia Systems, Infrastructure of audiovisual services—Coding of moving video, Advanced video coding for generic audiovisual services, total 836 pages.

Jiang Jun-ming, Low-cost Video Monitoring Scheme and Its Implementation under QNX, Shanghai Jiaotong University, Sep. 10, 2015, with an English abstract total 4 pages.

ITU-T H.265(Jun. 2019), Series H: Audiovisual and Multimedia Systems, Infrastructure of audiovisual services—Coding of moving video,High efficiency video coding, total 696 pages.

W. P. Lin et al., Remote underwater dual cameras video image acquisition system using Linux based embedded PC104, IEEE, Nov. 24, 2014, 6 pages.

\* cited by examiner

INFORMATION TRANSMISSION METHOD AND RELATED DEVICE

CROSS-REFERENCE TO RELATED APPLICATIONS

This application is a continuation of International Application No. PCT/CN2020/075778, filed on Feb. 18, 2020, the disclosure of which is hereby incorporated by reference in its entirety.

TECHNICAL FIELD

Embodiments of this application relate to the communication field, and in particular, to an information transmission method and a related device.

BACKGROUND

In a background of device intelligence, to enhance product competitiveness, camera devices as visual perception terminal devices are integrated as accessories on various devices.

A universal serial bus (USB) camera device is a widely used camera device. The USB camera device generally supports a USB video class (UVC) driver. A control device connected to the USB camera device performs data transmission with the USB camera device by using the UVC protocol, to control the USB camera device.

The UVC protocol allows the USB camera device to perform unidirectional transmission of video data to the control device, and the control device transmits a control signal with a small amount of data to the USB camera device.

SUMMARY

In view of the foregoing technical problem, embodiments of this application provide an information transmission method and a related device.

According to a first aspect, an embodiment of this application provides an information transmission method, including:

When a control device needs to communicate with a camera device, the control device may obtain a second UVC port and a second virtual network port based on configuration of a USB port of the control device. Accordingly, a first UVC port and a first virtual network port are configured on the camera device based on a USB port of the camera device. The first UVC port corresponds to the second UVC port, and the first virtual network port corresponds to the second virtual network port.

The control device and the camera device may establish a UVC channel based on the first UVC port and the second UVC port. After the UVC channel is established, the control device sends, to the camera device through the UVC channel, address information allocated to the camera device, and address information is also allocated to the control device.

Based on the first virtual network port, the second virtual network port, and the address information, the control device may establish a bidirectional transmission channel with the camera device. The bidirectional transmission channel may be used to perform bidirectional data transmission between the control device and the camera device.

In this embodiment of this application, a UVC port and a virtual network port may be configured separately for the control device and the camera device. Therefore, in addition to the UVC channel that may be established between the control device and the camera device, the bidirectional transmission channel may further be established between a virtual network port of the control device and a virtual network port of the camera device. In this way, more types of information may be transmitted between the control device and the camera device through the bidirectional transmission channel, thereby providing a solution for a related capability of the control device to flexibly control and call the camera device.

The camera device in this embodiment of this application provides a plurality of USB driver ports. A USB audio class (UAC) port and a UVC port may be virtualized based on the USB physical port by using a driver, so that audio is collected by using a microphone of the camera device, and real-time synchronous collection of video and the audio is implemented through one USB physical port.

Alternatively, a UAC port and a virtual network port may be virtualized based on the USB physical port by using a driver. A bidirectional transmission channel is established between an audio device and the control device. Audio data is processed in real time by using an AI algorithm on the audio device, and an audio processing result is transmitted to the control device through the bidirectional transmission channel.

Alternatively, a UAC port, a UVC port, and a virtual network port may be virtualized based on the USB physical port by using a driver, to implement combination of the three ports.

According to the first aspect in this embodiment of this application, in a first implementation of the first aspect in this embodiment of this application, the control device may set a kernel parameter of the USB port, to extend the USB port to the second UVC port and the second virtual network port.

According to the first implementation of the first aspect in this embodiment of this application, in a second implementation of the first aspect in this embodiment of this application, setting of the kernel parameter of the USB port by the control device includes: The control device sets CONFIG_USB_USBNET, CONFIG_USB_NET_CDCETHER, and CONFIG_USB_NET_RNDIS_HOST to "enabled". Specifically, values of the foregoing three parameters may be set to "y".

CONFIG_USB_USBNET=y indicates that USB Ethernet function configuration is enabled in a Linux kernel.

CONFIG_USB_NET_CDCETHER=y indicates that a USB communication device class (communication device class, CDC) device is enabled in the Linux kernel.

CONFIG_USB_NET_RNDIS_HOST=y indicates that an RNDIS host configuration is enabled in the Linux kernel.

According to any one of the first aspect to the second implementation of the first aspect in this embodiment of this application, in a third implementation of the first aspect in this embodiment of this application, the control device may generate first information. The first information includes the address information and a selection parameter. The selection parameter is set to a first value, and the first value may be 0x01. The first value indicates that the first information includes the address information. The control device sends the first information to the camera device through the UVC channel.

The first information in this embodiment of this application may further include a unit identifier. The unit identifier may be set to a specific value, for example, 0x11, and indicate that the first information is a structure of a UVC extended command. In this way, the camera device may learn that the first information is the structure of the UVC extended command, to further enter a process of obtaining the address information.

In this embodiment of this application, the control device may add the unit identifier and the selection parameter to the first information, so that the camera device determines, based on the unit identifier and the selection parameter, whether a corresponding field needs to be read to obtain the address information, thereby providing a specific implementation of the solution.

According to any one of the first aspect to the third implementation of the first aspect in this embodiment of this application, in a fourth implementation of the first aspect in this embodiment of this application, the control device may obtain a version number of the camera device from the camera device through the UVC channel. If the control device determines that the version number of the camera device is lower than an updatable version number, the control device may send updatable upgrade data to the camera device through the bidirectional transmission channel. The updatable upgrade data is used to upgrade and update the camera device.

The version number may be a firmware version number of the camera device, or may be a version number of software on the camera device. Accordingly, the upgrade data may be firmware upgrade data, or may be software upgrade data or upgrade data of an algorithm. It should be understood that software or an algorithm library of the camera device may alternatively be collectively referred to as firmware.

In this embodiment of this application, the bidirectional transmission channel may be used by the control device to send the upgrade data to the camera device, and the camera device may perform upgrading and updating based on the upgrade data.

According to the fourth implementation of the first aspect in this embodiment of this application, in a fifth implementation of the first aspect in this embodiment of this application, the control device may generate second information. The second information includes a selection parameter. The selection parameter is set to a second value, and the first value may be 0x02. The second value indicates the camera device to return the version number of the camera device. The control device receives, through the UVC channel, third information sent by the camera device. The third information includes the version number of the camera device.

In this embodiment of this application, a selection parameter field may be reused, and different functions are implemented by setting different values. For example, when the selection parameter field is set to 0x01, the selection parameter field may be used to set the address information for the camera device, and when the selection parameter field is set to 0x02, the selection parameter field may indicate to the camera device to feed back the version number.

According to any one of the first aspect to the fifth implementation of the first aspect in this embodiment of this application, in a sixth implementation of the first aspect in this embodiment of this application, the control device determines a target AI algorithm library based on selection of a user. The target AI algorithm library indicates an AI function selected by the user. If the target AI algorithm library is different from a local AI algorithm library of the camera device, the control device sends the target AI algorithm library to the camera device through the bidirectional transmission channel. The target AI algorithm library is used by the camera device to update the local AI algorithm library.

In this embodiment of this application, the bidirectional transmission channel may be used by the control device to send the target AI algorithm library to the camera device, and the camera device may update the local AI algorithm library based on the target AI algorithm library.

According to any one of the first aspect to the sixth implementation of the first aspect in this embodiment of this application, in a seventh implementation of the first aspect in this embodiment of this application, the control device may determine, based on a user requirement, a target AI function that needs to be called. The target AI function belongs to an AI function released by the camera device. The control device sends a call instruction for the target AI function to the camera device through the bidirectional transmission channel. The camera device generates result data after executing the target AI function. The control device receives, through the bidirectional transmission channel, the result data sent by the camera device.

In this embodiment of this application, the bidirectional transmission channel may be used by the control device to send the call instruction for the target AI function to the camera device, and receive the result data generated by the camera device after executing the target AI function, so that the control device calls the target AI function of the camera device.

According to any one of the first aspect to the seventh implementation of the first aspect in this embodiment of this application, in an eighth implementation of the first aspect in this embodiment of this application, the address information may be IP address information, the first virtual network port may be a first RNDIS port, the second virtual network port may be a second RNDIS port, and the bidirectional transmission channel may be a TCP/IP bidirectional transmission channel.

According to any one of the first aspect to the eighth implementation of the first aspect in this embodiment of this application, in a ninth implementation of the first aspect in this embodiment of this application, the control device may allocate the IP address information to the camera device by using a DHCP, and the IP address information and IP address information of the control device belong to a same address segment.

According to any one of the first aspect to the ninth implementation of the first aspect in this embodiment of this application, in a tenth implementation of the first aspect in this embodiment of this application, a method for the control device to obtain the second UVC port and the second virtual network port based on configuration of the USB port of the control device may be specifically as follows: The control device modifies a driver of the control device, and declares, on the control device, the USB port as a USB AI device, to extend the USB port to the second UVC port and a port for the USB AI device. After the control device and the camera device establish the bidirectional transmission channel, the control device performs data transmission with the USB AI device through the bidirectional transmission channel and based on a preset read/write function.

According to any one of the first aspect to the tenth implementation of the first aspect in this embodiment of this application, in an eleventh implementation of the first aspect in this embodiment of this application, the control device receives, through the UVC channel, a target video image data frame sent by the camera device. The target video image data frame carries AI data corresponding to the target video image data frame, and the control device obtains the required AI data from the target video image data frame.

In this embodiment of this application, a method for obtaining the AI data by the control device through the UVC channel is provided.

According to the eleventh implementation of the first aspect in this embodiment of this application, in a twelfth implementation of the first aspect in this embodiment of this application, that the target video image data frame carries AI data corresponding to the target video image data frame may be specifically that the target video image data frame includes a payload data type field and a payload data content field, and when the payload data type field indicates a type of the AI data, the payload data content field carries the AI data corresponding to the target video image data frame.

In this embodiment of this application, the control device may obtain the target video image data frame from the camera device through the UVC channel, and obtain the AI data from the target video image data frame. Therefore, the AI data may be sent through the UVC channel, thereby improving data sending flexibility. In this embodiment of this application, the AI data is added to a video bitstream, and the AI data and video frame image data are synchronously transmitted to the control device.

According to the eleventh or twelfth implementation of the first aspect in this embodiment of this application, in a thirteenth implementation of the first aspect in this embodiment of this application, when the target video image data frame is in an encoding format such as H.264 or H.265, a process in which the control device obtains the AI data from the target video image data frame may be as follows: When a value of a nal_unit_type field of the target video image data frame is a preset value (for example, 0x06), the control device may determine that the object is of an SEI type. In this case, the control device may further determine whether a value of an SEI payload type field of the target video image data frame indicates a type of the AI data (for example, a type of private AI data). If the value of the SEI payload type field of the target video image data frame indicates a type of the AI data, a decoder of the control device may upload the data to an upper-layer service layer of the control device. After the upper-layer service layer reads that nal_unit_type is the SEI type, if a payload type indicates a type of the AI data, the AI data may be extracted from an SEI payload content field based on a payload size.

In this embodiment of this application, a specific process in which the control device obtains the AI data from the target video image data frame in the encoding format such as H.264 or H.265 is provided, thereby providing a specific technical implementation.

According to any one of the first aspect to the thirteenth implementation of the first aspect in this embodiment of this application, in a fourteenth implementation of the first aspect in this embodiment of this application, if a Windows operating system is used in the control device, the USB port of the camera device is configured as follows: The first virtual network port occupies an interface of the USB port before the first UVC port occupies the interface of the USB port.

The Windows operating system has a special regulation for port identification. To be specific, when a UVC port is identified, identification stops. Therefore, in this embodiment of this application, when the Windows operating system is used in the control device, the USB port of the camera device needs to be set as follows: The first virtual network port occupies the interface of the USB port before the first UVC port occupies the interface of the USB port. In this way, the control device can simultaneously identify the two ports. To be specific, the USB port of the camera device is identified as the first UVC port and the first virtual network port.

According to a second aspect, an embodiment of this application provides an information transmission method, including:

When a camera device needs to communicate with a control device, a first UVC port and a first virtual network port are configured on the camera device based on a USB port of the camera device. Accordingly, the control device may obtain a second UVC port and a second virtual network port based on configuration of a USB port of the control device. The first UVC port corresponds to the second UVC port, and the first virtual network port corresponds to the second virtual network port.

The camera device and the control device may establish a UVC channel based on the first UVC port and the second UVC port. After the UVC channel is established, the camera device may receive, through the UVC channel, address information allocated by the control device to the camera device. Accordingly, address information is also allocated to the control device.

Based on the first virtual network port, the second virtual network port, and the address information, the camera device may establish a bidirectional transmission channel with the control device. The bidirectional transmission channel may be used to perform bidirectional data transmission between the camera device and the control device.

According to the second aspect in this embodiment of this application, in a first implementation of the second aspect in this embodiment of this application, a process in which the camera device obtains the first UVC port and the first virtual network port based on configuration of the USB port of the camera device may be as follows: The camera device modifies a driver of the USB port, to extend the USB port to the first UVC port and the first virtual network port.

According to the first implementation of the second aspect in this embodiment of this application, in a second implementation of the second aspect in this embodiment of this application, modification of the driver of the USB port by the camera device includes the following steps. The camera device creates a UVC function instance based on the USB port of the camera device. The camera device sets a camera device capability description parameter and a type description parameter based on the UVC function instance, to generate the first UVC port. The camera device creates an RNDIS virtual port function instance based on the USB port of the camera device. The camera device sets an RNDIS configuration parameter based on the RNDIS virtual port function instance. The camera device starts extension of an operating system, sets a vendor code and a signature, and configures RNDIS_WCID into a buffer allocated by an RNDIS virtual port function instance driver, to generate the first virtual network port.

According to the first implementation of the second aspect in this embodiment of this application, in a second implementation of the second aspect in this embodiment of this application, the camera device capability description parameter may include at least one of a stream interval, a maximum packet length, a UVC control command parameter, a UVC video stream parameter, a maximum packet length for a UVC video stream, and/or a video stream interval. The type description parameter may include at least one of a quantity of USB devices, a name, a product identifier, a product serial number, and/or a product manufacturer name.

The RNDIS configuration parameter may include at least one of a power supply type and/or maximum power consumption.

According to any one of the second aspect to the second implementation of the second aspect in this embodiment of this application, in a third implementation of the second aspect in this embodiment of this application, before the camera device obtains the first UVC port and the first virtual network port based on configuration of a USB port of the camera device, the camera device determines operating system information of the control device. If the operating system information indicates that a Windows operating system is used in the control device, the camera device configures, based on the USB port of the camera device, the first virtual network port to occupy an interface of the USB port before the first UVC port occupies the interface of the USB port.

The Windows operating system has a special regulation for port identification. To be specific, when a UVC port is identified, identification stops. Therefore, in this embodiment of this application, when the Windows operating system is used in the control device, the USB port of the camera device needs to be set as follows: The first virtual network port occupies the interface of the USB port before the first UVC port occupies the interface of the USB port. In this way, the control device can simultaneously identify the two ports. To be specific, the USB port of the camera device is identified as the first UVC port and the first virtual network port.

According to any one of the second aspect to the third implementation of the second aspect in this embodiment of this application, in a fourth implementation of the second aspect in this embodiment of this application, a process in which the camera device receives, through the UVC channel, the address information sent by the control device may be as follows: The camera device receives, through the UVC channel, first information sent by the control device. The camera device obtains a selection parameter included in the first information. If the selection parameter is a first value, for example, 0x01, the camera device obtains the address information from the first information.

The first information in this embodiment of this application may further include a unit identifier. The unit identifier may be set to a specific value, for example, 0x11, and indicates that the first information is a structure of a UVC extended command. In this way, when the camera device determines based on the value that the first information is the structure of the UVC extended command, the camera device may further enter a process of obtaining the address information.

According to any one of the second aspect to the fourth implementation of the second aspect in this embodiment of this application, in a fifth implementation of the second aspect in this embodiment of this application, the camera device may receive, through the UVC channel, second information sent by the control device. The camera device obtains a selection parameter included in the second information. If the selection parameter is a second value, the camera device obtains a version number of the camera device. The camera device sends third information to the control device through the UVC channel. The third information includes the version number of the camera device.

In this embodiment of this application, a selection parameter field may be reused, and different functions are implemented by setting different values. For example, when the selection parameter field is set to 0x01, the selection parameter field may be used to set the address information for the camera device, and when the selection parameter field is set to 0x02, the selection parameter field may indicate to the camera device to feed back the version number.

According to the fifth implementation of the second aspect in this embodiment of this application, in a sixth implementation of the second aspect in this embodiment of this application, after the camera device and the control device establish the bidirectional transmission channel, the camera device receives, through the bidirectional transmission channel, updatable upgrade data sent by the control device. The camera device performs upgrading and updating based on the updatable upgrade data.

In this embodiment of this application, the bidirectional transmission channel may be used by the camera device to receive the upgrade data sent by the control device, and the camera device may perform upgrading and updating based on the upgrade data.

The version number fed back by the camera device may be a firmware version number of the camera device, or may be a version number of software on the camera device. Accordingly, the upgrade data may be firmware upgrade data, or may be software upgrade data.

In this embodiment of this application, the bidirectional transmission channel may be used by the control device to send the upgrade data to the camera device, and the camera device may perform upgrading and updating based on the upgrade data.

According to any one of the second aspect to the sixth implementation of the second aspect in this embodiment of this application, in a seventh implementation of the second aspect in this embodiment of this application, after the camera device and the control device establish the bidirectional transmission channel, the camera device receives, through the bidirectional transmission channel, a target AI algorithm library sent by the control device. The camera device updates a local AI algorithm library to the target AI algorithm library.

In this embodiment of this application, the bidirectional transmission channel may be used by the camera device to receive the target AI algorithm library sent by the control device, and the camera device may update the local AI algorithm library based on the target AI algorithm library.

According to any one of the second aspect to the seventh implementation of the second aspect in this embodiment of this application, in an eighth implementation of the second aspect in this embodiment of this application, the camera device releases an AI function. The control device may obtain the AI function released by the camera device. After the camera device and the control device establish the bidirectional transmission channel, the camera device receives, through the bidirectional transmission channel, a call instruction for a target AI function sent by the control device. The target AI function belongs to the AI function released by the camera device. The camera device executes the target AI function based on the call instruction and obtains result data. The camera device sends the result data to the control device through the bidirectional transmission channel.

In this embodiment of this application, the bidirectional transmission channel may be used by the camera device to receive the call instruction for the target AI function sent by the control device, and may be further used by the camera device to send, to the control device, the result data generated after the camera device executes the target AI function, so that the control device calls the target AI function of the camera device.

According to any one of the second aspect to the eighth implementation of the second aspect in this embodiment of this application, in a ninth implementation of the second aspect in this embodiment of this application, the address information may be IP address information, the first virtual network port may be a first RNDIS port, the second virtual network port may be a second RNDIS port, and the bidirectional transmission channel may be a TCP/IP bidirectional transmission channel.

According to any one of the second aspect to the eighth implementation of the second aspect in this embodiment of this application, in a ninth implementation of the second aspect in this embodiment of this application, a process in which the camera device obtains the first UVC port and the first virtual network port based on configuration of the USB port of the camera device may be as follows: The camera device modifies a driver of the camera device, and declares, on the camera device, the USB port as a USB AI device, to extend the USB port to the first UVC port and a port for the USB AI device. After the camera device and the control device establish the bidirectional transmission channel, the camera device performs data transmission with the control device through the bidirectional transmission channel and based on a preset read/write function.

According to any one of the second aspect to the eleventh implementation of the second aspect in this embodiment of this application, in a twelfth implementation of the second aspect in this embodiment of this application, when performing a photography function, the camera device may obtain an original video image data frame, and add AI data to all or some obtained original video image data frames to obtain a target video image data frame. Specifically, the target video image data frame includes a payload data type field and a payload data content field. When the payload data type field indicates a type of the AI data, the payload data content field carries the AI data corresponding to the target video image data frame.

After generating the target video image data frame, the camera device may send the target video image data frame to the control device through the UVC channel.

According to any one of second aspect to the twelfth implementation of the second aspect in this embodiment of this application, in a thirteenth implementation of the second aspect in this embodiment of this application, a process in which the camera device adds the AI data to the original video image data frame to obtain the target video image data frame includes:

The camera device sets a value of a nal_unit_type field of the target video image data frame to a preset value, sets a value of an SEI payload type field of the target video image data frame to indicate a type of the AI data, and adds the AI data to an SEI payload content field of the target video image data frame.

Specifically, when the target video image data frame is in an encoding format such as H.264 or H.265, supplemental enhancement information (SEI) may be selected from an H.264 network abstraction layer (NAL) header structure of the camera device, nal_unit_type=0x06 is specified, and the SEI payload type is specified as a type of private AI data. An SEI payload size is set to indicate a payload length in bytes. The AI data is written into the SEI payload content field.

In this embodiment of this application, the camera device may send the target video image data frame including the AI data to the control device through the UVC channel, so that the control device may obtain the AI data from the target video image data frame. Therefore, the AI data may be sent through the UVC channel, thereby improving data sending flexibility.

According to a third aspect, an embodiment of this application provides an information transmission method, including:

When a control device needs to communicate with a camera device, the control device and the camera device respectively configure a UVC port, and establish a UVC channel through the UVC ports of the control device and the camera device.

After the UVC channel is established, the control device may receive, through the UVC channel, a target video image data frame sent by the camera device. The target video image data frame includes AI data corresponding to the target video image data frame. Specifically, the target video image data frame includes a payload data type field and a payload data content field. When the payload data type field indicates a type of the AI data, the payload data content field carries the AI data corresponding to the target video image data frame.

The control device may obtain the AI data from the target video image data frame.

In this embodiment of this application, the control device may obtain the target video image data frame from the camera device through the UVC channel, and obtain the AI data from the target video image data frame. Therefore, the AI data may be sent through the UVC channel, thereby improving data sending flexibility. Further, because the AI data is carried in an existing video bitstream, synchronous transmission of the AI data and video frame image data can be implemented.

According to the third aspect in this embodiment of this application, in a first implementation of the third aspect in this embodiment of this application, when the target video image data frame is in an encoding format such as H.264 or H.265, a process in which the control device obtains the AI data from the target video image data frame may be as follows: When a value of a nal_unit_type field of the target video image data frame is a preset value (for example, 0x06), the control device may determine that the object is of an SEI type. In this case, the control device may further determine whether a value of an SEI payload type field of the target video image data frame indicates a type of the AI data (for example, a type of private AI data). If the value of the SEI payload type field of the target video image data frame indicates a type of the AI data, a decoder of the control device may upload the data to an upper-layer service layer of the control device. After the upper-layer service layer reads that nal_unit_type is the SEI type, if a payload type indicates a type of the AI data, the AI data may be extracted from an SEI payload content field based on a payload size.

In this embodiment of this application, a specific process in which the control device obtains the AI data from the target video image data frame in the encoding format such as H.264 or H.265 is provided, thereby providing a specific technical implementation.

According to a fourth aspect, an embodiment of this application provides an information transmission method, including:

When a camera device needs to communicate with a control device, the camera device and the control device respectively configure a UVC port, and establish a UVC channel through the UVC ports of the camera device and the control device.

When performing a photography function, the camera device may obtain an original video image data frame, and add AI data to all or some obtained original video image data frames to obtain a target video image data frame. Specifically, the target video image data frame includes a payload data type field and a payload data content field. When the payload data type field indicates a type of the AI data, the payload data content field carries the AI data corresponding to the target video image data frame.

After generating the target video image data frame, the camera device may send the target video image data frame to the control device through the UVC channel.

In this embodiment of this application, the camera device may send the target video image data frame including the AI data to the control device through the UVC channel, so that the control device may obtain the AI data from the target video image data frame. Therefore, the AI data may be sent through the UVC channel, thereby improving data sending flexibility.

According to the fourth aspect in this embodiment of this application, in a first implementation of the fourth aspect in this embodiment of this application, when the target video image data frame is in an encoding format such as H.264 or H.265, supplemental enhancement information (SEI) may be selected from an H.264 network abstraction layer (NAL) header structure of the camera device, nal_unit_type=0x06 is specified, and an SEI payload type is specified as a type of private AI data. An SEI payload size is set to indicate a payload length in bytes. The AI data is written into SEI payload content field.

In this embodiment of this application, a specific process in which the camera device adds the AI data to the original video image data frame in the encoding format such as H.264 or H.265 is provided, thereby providing a specific technical implementation.

According to a fifth aspect, an embodiment of this application provides an information transmission apparatus. The apparatus may be used as a control device, and the apparatus has a function of implementing the method according to any one of the first aspect or the third aspect and the implementations of the first aspect or the third aspect. The apparatus includes a processor and a transmission interface. The transmission interface is configured to receive or send data. The processor is configured to call software instructions stored in a memory, to perform the information transmission method according to any one of the first aspect or the third aspect and the implementations of the first aspect or the third aspect.

According to a sixth aspect, an embodiment of this application provides an information transmission apparatus. The apparatus may be used as a control device, and the apparatus includes:
  a configuration unit, configured to obtain a second universal serial bus video class UVC port and a second virtual network port based on configuration of a universal serial bus USB port of the control device;
  a determining unit, configured to determine address information of a camera device, where a first UVC port and a first virtual network port are configured on the camera device, and the first UVC port and the first virtual network port are obtained based on configuration of a USB port of the camera device;
  a sending unit, configured to send the address information to the camera device through a UVC channel, where the UVC channel is established based on the first UVC port and the second UVC port; and
  an establishment unit, configured to establish, with the camera device, a bidirectional transmission channel based on the first virtual network port, the second virtual network port, and the address information.

The units in the control device in this embodiment of this application may be configured to perform functions of the method according to any one of the first aspect and the implementations of the first aspect.

According to a seventh aspect, an embodiment of this application provides a camera apparatus. The apparatus may be used as a camera device, and the apparatus has a function of implementing the method according to any one of the second aspect or the fourth aspect and the implementations of the second aspect or the fourth aspect. The apparatus includes a processor and a transmission interface. The transmission interface is configured to receive or send data. The processor is configured to call software instructions stored in a memory, to perform the information transmission method according to any one of the second aspect or the fourth aspect and the implementations of the second aspect or the fourth aspect.

According to an eighth aspect, an embodiment of this application provides a camera apparatus. The apparatus may be used as a camera device, and the apparatus includes:
  a configuration unit, configured to obtain a first UVC port and a first virtual network port based on configuration of a USB port of the camera device;
  a receiving unit, configured to receive, through a UVC channel, address information sent by a control device, where the UVC channel is established based on the first UVC port and a second UVC port, the second UVC port and a second virtual network port are configured on the control device, and the second UVC port and the second virtual network port are obtained based on configuration of a USB port of the control device; and
  an establishment unit, configured to establish, with the control device, a bidirectional transmission channel based on the first virtual network port, the second virtual network port, and the address information.

The units in the camera device in this embodiment of this application may be configured to perform functions of the method according to any one of the second aspect and the implementations of the second aspect.

According to a ninth aspect, an embodiment of this application provides a computer-readable storage medium. The computer-readable storage medium stores instructions. When the instructions are executed on a computer or a processor, the computer or the processor is enabled to perform the method according to any one of the first aspect, the second aspect, the third aspect, or the fourth aspect and the implementations of the first aspect, the second aspect, the third aspect, or the fourth aspect.

According to a ninth aspect, an embodiment of this application provides a computer program product. When the computer program product runs on a computer or a processor, the computer or the processor is enabled to perform the method according to any one of the first aspect, the second aspect, the third aspect, or the fourth aspect and the implementations of the first aspect, the second aspect, the third aspect, or the fourth aspect.

DESCRIPTION OF EMBODIMENTS

The following clearly and completely describes the technical solutions in embodiments of this application with reference to the accompanying drawings in embodiments of this application. It is clear that the described embodiments are merely some but not all of embodiments of this application.

In the specification, claims, and accompanying drawings of this application, the terms "first", "second", "third", "fourth", and so on (if available) are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those expressly listed steps or units, but may include other steps or units that are not expressly listed or that are inherent to such a process, method, system, product, or device. The term "and/or" refers to either or both of them.

Figure 1:
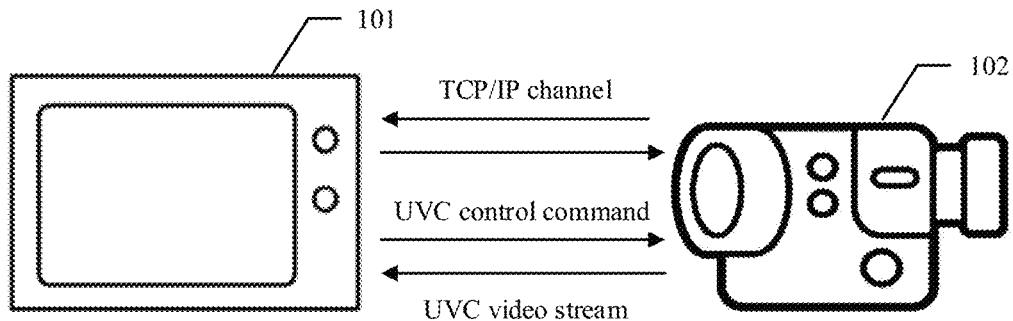
FIG. 1 is a schematic diagram of an interaction architecture between a control device and a camera device according to an embodiment of this application.

Refer to FIG. 1. Technical solutions provided in embodiments of this application may be applied to information transmission between a control device 101 and a camera device 102. There is a UVC channel and a bidirectional transmission channel between the control device 101 and the camera device 102. In embodiments of this application, the control device may be any device such as a personal computer (PC) or a mobile phone. The camera device in this application may have an AI capability. For example, the AI capability may be AI face detection or AI bone recognition. This is not specifically limited herein.

Figure 2:
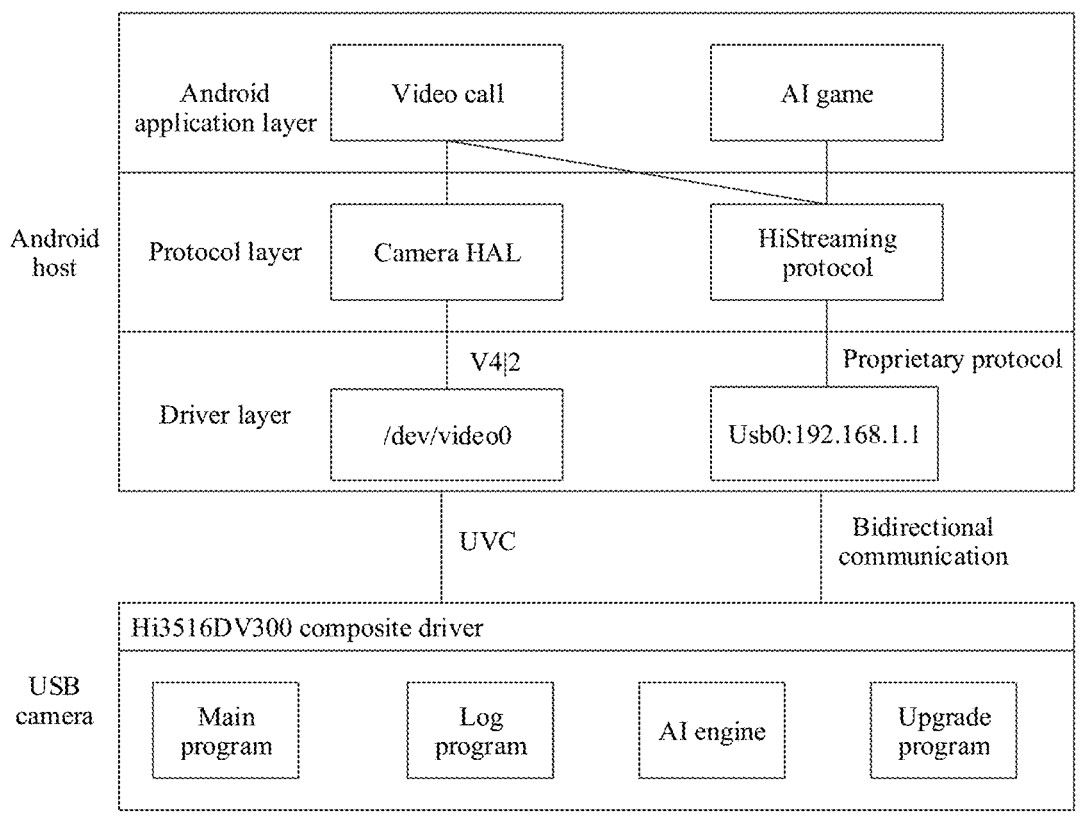
FIG. 2 is a schematic diagram of a functional architecture of a control device and a camera device in an Android environment according to an embodiment of this application.

Refer to FIG. 2. An example in which a control device works in an Android environment and a camera device works in a Linux environment is used.

An application program of the Android-based control device works at an Android application layer. In actual running, the application program of the control device may call a camera HAL of a protocol layer through a Camera2 API provided by an Android framework. Then, the control device calls a Video4Linux2 (V4L2) interface at a driver layer by using the camera HAL of the protocol layer, and finally controls the camera device by using a UVC protocol.

An application (such as an AI game application and a video call application) that requires an artificial intelligence (AI) function and video can simultaneously use the Camera2 API, to call the camera device to collect a video image by using the UVC protocol. In addition, the application controls an AI function of the camera device and obtains an AI computing result of the camera device by calling a HiStreaming protocol interface and through a bidirectional communication channel, such as a transmission control protocol/Internet protocol (TCP/IP) channel.

Figure 3:
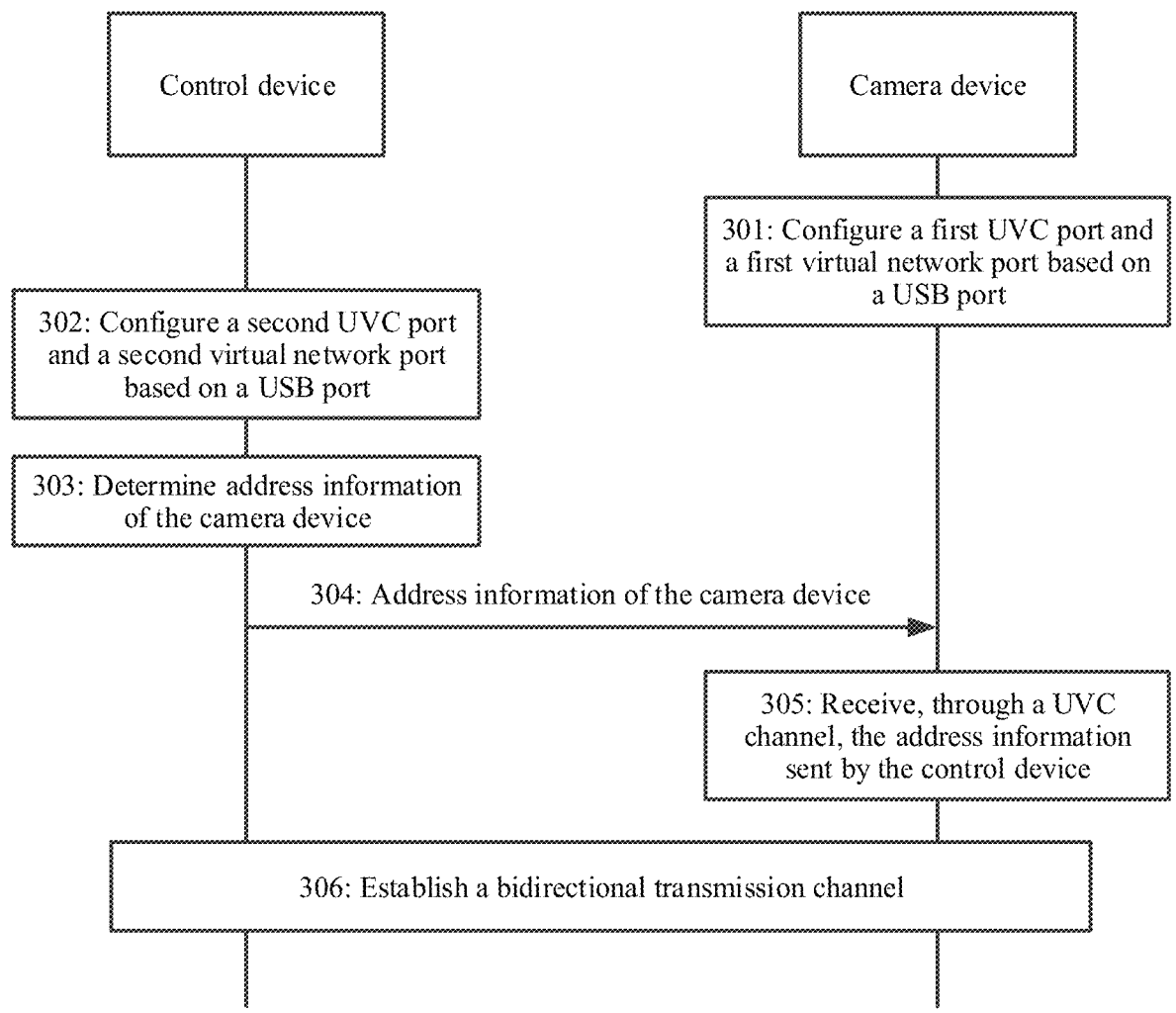
FIG. 3 is a schematic diagram of an information transmission method according to an embodiment of this application.

Refer to FIG. 3. An information transmission method according to an embodiment of this application includes the following steps.

301: A camera device configures a first UVC port and a first virtual network port based on a USB port.

In this embodiment, the camera device may modify a driver layer, and extend the camera device to a composite device. Specifically, the camera device may provide a plurality of USB driver ports. One driver port is configured as the first UVC port, and another driver port may be configured as the first virtual network port, that is, two ports of different device types are virtualized based on one USB physical port by using a driver. The first UVC port and first virtual network port may be simultaneously loaded through the USB physical port.

Specifically, during actual application, the first virtual network port may be a remote network driver interface specification (RNDIS) port or a virtual network port of another type. This is not specifically limited herein. In this embodiment and subsequent embodiments, only the RNDIS port is used as an example for description.

In this embodiment, a specific process in which the camera device configures the first UVC port includes:

1. The camera device creates and obtains a UVC function instance (f_uvc) based on the USB port of the camera device.

2. The camera device sets a camera device capability description parameter and a type description parameter based on the UVC function instance, to generate the first UVC port.

The camera device capability description parameter includes at least one of a stream interval, a maximum packet length, a UVC control command parameter, a UVC video stream parameter, a maximum packet length for a UVC video stream, or a video stream interval.

The type description parameter includes at least one of a quantity of USB devices, a name, a product identifier, a product serial number, or a product manufacturer name.

In this embodiment, a specific process in which the camera device configures the first RNDIS port includes:

1. The camera device creates an RNDIS virtual port function instance (f_rndis) based on the USB port of the camera device.

2. The camera device sets an RNDIS configuration parameter based on the RNDIS virtual port function instance, to generate the first RNDIS port.

3. The camera device starts extension of an operating system, sets a vendor code (vendor_code (WCID_VENDOR)) and a signature (sign), and configures RNDIS_WCID into a buffer allocated by a (f_rndis) driver, to generate the first RNDIS port.

The RNDIS configuration parameter includes at least one of a power supply type or maximum power consumption.

It should be noted that, after the camera device is connected to a control device, if it is determined that a Windows operating system is used in the control device, a problem occurs when the control device identifies the camera device. The UVC port occupies an interface originally allocated to the RNDIS port, and as a result, a driver of the Windows operating system cannot interconnect with and use the RNDIS port.

In this case, to avoid identification failure, in a process in which the camera device configures the first UVC port and the first RNDIS port, the first RNDIS port needs to be configured to occupy the interface of the USB port before the first UVC port occupies the interface of the USB port.

When the camera device configures the first UVC port and first RNDIS port in the foregoing manner, an interface ID needs to be reserved for the first RNDIS port. A reservation manner may be setting c→next_interface_id.

Specifically, the following steps may be performed.

1. Configure the first UVC port to first allocate an endpoint with better performance to the first UVC port.

2. After the first UVC port is configured, reset c→next_interface_id to 0, so that when the first RNDIS port is configured subsequently, 0 and 1 can be allocated.

3. Reserve a current value of config→next_itf_id, and after the first RNDIS port is configured, restore confg→next_itf_id to this value.

4. Adjust a sequence of cdev→functions, so that the first RNDIS port occupies the interface before the first UVC port occupies the interface.

Figure 4:
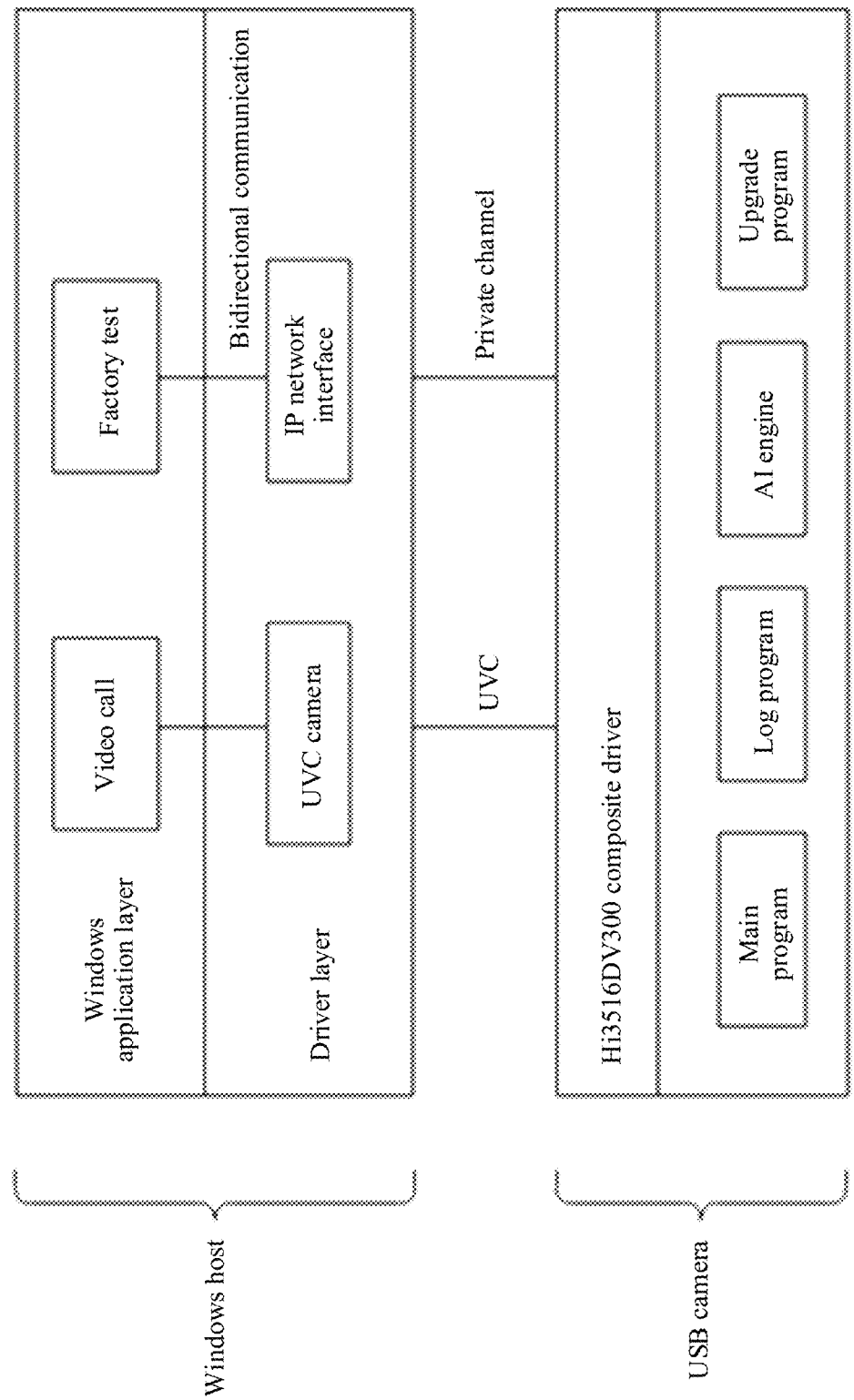
FIG. 4 is a schematic diagram of a functional architecture of a control device and a camera device in a Windows environment according to an embodiment of this application.

Refer to FIG. 4. When the Windows operating system is used in the control device, based on the foregoing configuration manner, after the camera device is successfully connected to the control device, the Windows driver of the control device may identify the camera device as two different devices: a UVC camera and a network port. In other words, the Windows driver identifies the first UVC port and the first RNDIS port that are configured by the camera device.

302: The control device configures a second UVC port and a second virtual network port based on a USB port.

In this embodiment, the camera device is connected to the control device through the USB interface. The camera device may be extended to a composite device having a plurality of ports. Accordingly, to communicate with the camera device, the control device also needs to configure corresponding ports based on the USB port of the control device, specifically, the second UVC port and the second virtual network port.

An example in which the second virtual network port is a second RNDIS port is used for description.

In this embodiment, the control device may configure the second UVC port and the second RNDIS port by setting a kernel parameter of the USB port.

Specifically, arch/arm/configs can be found in a kernel root directory of the control device and a corresponding kernel configuration file in arch/arm/configs is modified as follows:

CONFIG_USB_USBNET=y;
CONFIG_USB_NET_CDCETHER=y; and
CONFIG_USB_NET_RNDIS_HOST=y, where
CONFIG_USB_USBNET=y indicates that USB Ethernet function configuration is enabled in a Linux kernel;
CONFIG_USB_NET_CDCETHER=y indicates that a USB communication device class (CDC) device is enabled in the Linux kernel; and
CONFIG_USB_NET_RNDIS_HOST=y indicates that an RNDIS host configuration is enabled in the Linux kernel.

After a kernel of the control device is recompiled and burnt, the second UVC port and second RNDIS port are configured by the control device. In other words, the first UVC port and first RNDIS port of the camera device can be identified. To be specific, after the control device modifies the foregoing three types of kernel parameters, the USB port of the control device may be extended to a composite port having a UVC port and an RNDIS port.

In this embodiment, after the first UVC port of the camera device and the second UVC port of the control device are configured, the camera device may establish a UVC channel with the control device. A specific establishment process is not limited herein.

303: The control device determines address information of the camera device.

In a local area network formed by USB cable connection, network communication can be performed only after address information is configured for the control device and the camera device. There may be a plurality of specific network communication protocols. In this embodiment and subsequent embodiments, only a transmission control protocol/Internet protocol (TCP/IP) is used as an example for description, and accordingly, the address information may be IP address information.

In this embodiment, both IP address information of the control device and IP address information of the camera device may be obtained by using a dynamic host configuration protocol (DHCP). A specific obtaining manner is not described herein again, provided that the IP address information of the control device and the IP address information of the camera device belong to a same address segment.

304: The control device sends the address information of the camera device to the camera device through the UVC channel.

In this embodiment, after allocating the IP address information to the camera device, the control device may generate first information. The first information includes the IP address information and a selection parameter. The selection parameter is set to a first value. The first value indicates that the first information includes the IP address information. The control device may send the first information to the camera device through the UVC channel.

This embodiment is described by using an example in which a structure is used as the first information.

The control device fills in a structure in the kernel, for example, a uvc_xu_control_mapping structure in Linux uvcvideo.h.

The uvc_xu_control_mapping structure may include a plurality of parameters.

An identifier information (identity, ID) parameter, for example, UVC_VC_EXTENSION_UNIT, may be set to a preset value, for example, 0x06, in this embodiment. The value indicates that UVC communication is performed between the control device and the camera device.

An entity parameter is set to a specified GUID.

A selection parameter (selector) indicates a role or a function of the structure. In this embodiment, the selection parameter may be set to the first value (for example, 0x01), indicate that the structure includes the IP address information, and may be used to configure the IP address information for the camera device. The selection parameter may alternatively be set to another value for indicating other information, which is described in subsequent embodiments and is not limited herein.

The uvc_xu_control_mapping structure filled in with parameters is registered with the Linux kernel of the control device by using a UVCIOC_CTRL_MAP command word. In this way, the control device can store the IP address information of the camera device.

The control device sets a uvc_xu_control_query structure. In the structure, a unit ID is UVC_QUERY_UNIT=0x11, and query is UVC_SET_CUR. The control device writes the IP address information into a structure array (data), and the control device writes the IP address information into the kernel by using a UVCIOC_CTRL_QUERY command word.

305: The camera device receives, through the UVC channel, the address information sent by the control device.

After receiving a notification event through the UVC channel, the camera device obtains the unit ID from the received structure. If the unit ID is 0x11, it indicates that the structure is a structure of a UVC extended command. After receiving UVC_SET_CUR, the camera device reads data, obtains the selection parameter, and determines the value of the selection parameter. If the value is 0x01, it indicates that the structure includes the IP address information. In this case, the camera device may store the received data as the IP address information of the camera device.

Figure 5:
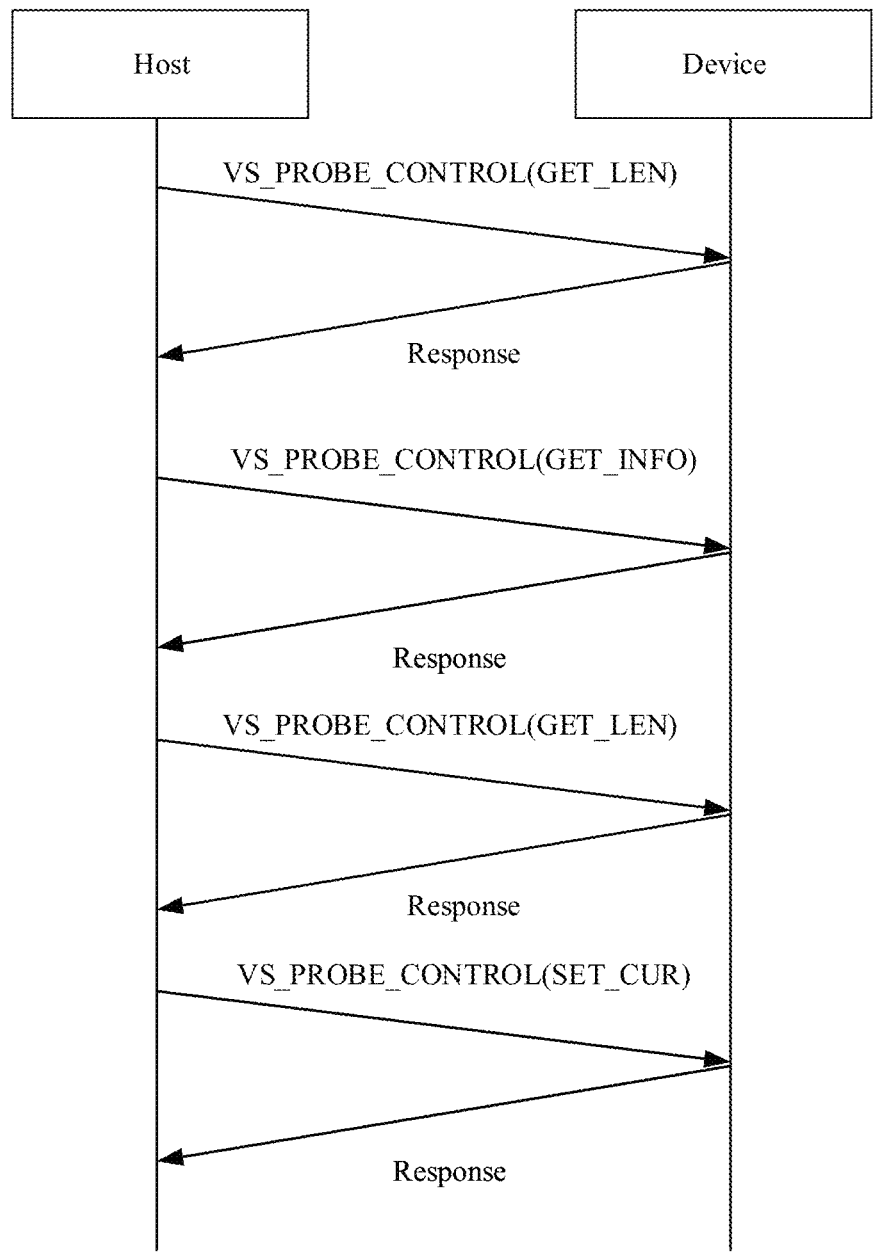
FIG. 5 is a schematic diagram of a configuration process of IP address information according to an embodiment of this application.

In this embodiment, a process in which the control device configures the IP address information for the camera device may be shown in FIG. 5. A VS_PROBE_CONTROL (GET_LEN) command is to query a length in bytes of a UVC control command, and a VS_PROBE_CONTROL (GET_INFO) command is to query an information bitmap of the UVC control command. The information bitmap is a determining indicator of whether the camera device supports a GET/SET type requirement. The GET type requirement may be any one of the VS_PROBE_CONTROL(GET_INFO) command, the VS_PROBE_CONTROL (GET_LEN) command, or the like. A SET command may be, for example, VS_PROBE_CONTROL(SET_CUR), and RESPONSE is reply information of the camera device based on a command of the control device.

306: The control device and the camera device establish a bidirectional transmission channel based on the first virtual network port, the second virtual network port, and the address information.

In this embodiment, after the camera device stores the IP address information, the control device and the camera device establish a TCP/IP bidirectional transmission channel based on the first RNDIS port, the second RNDIS port, the IP address information of the control device, and the IP address information of the camera device. A specific process is not described herein again.

After establishing the TCP/IP bidirectional transmission channel with the camera device, the control device may perform data transmission based on the TCP/IP bidirectional transmission channel. The following uses examples in several application scenarios for description.

1. The control device upgrades and updates the camera device based on the TCP/IP bidirectional transmission channel.

Figure 6:
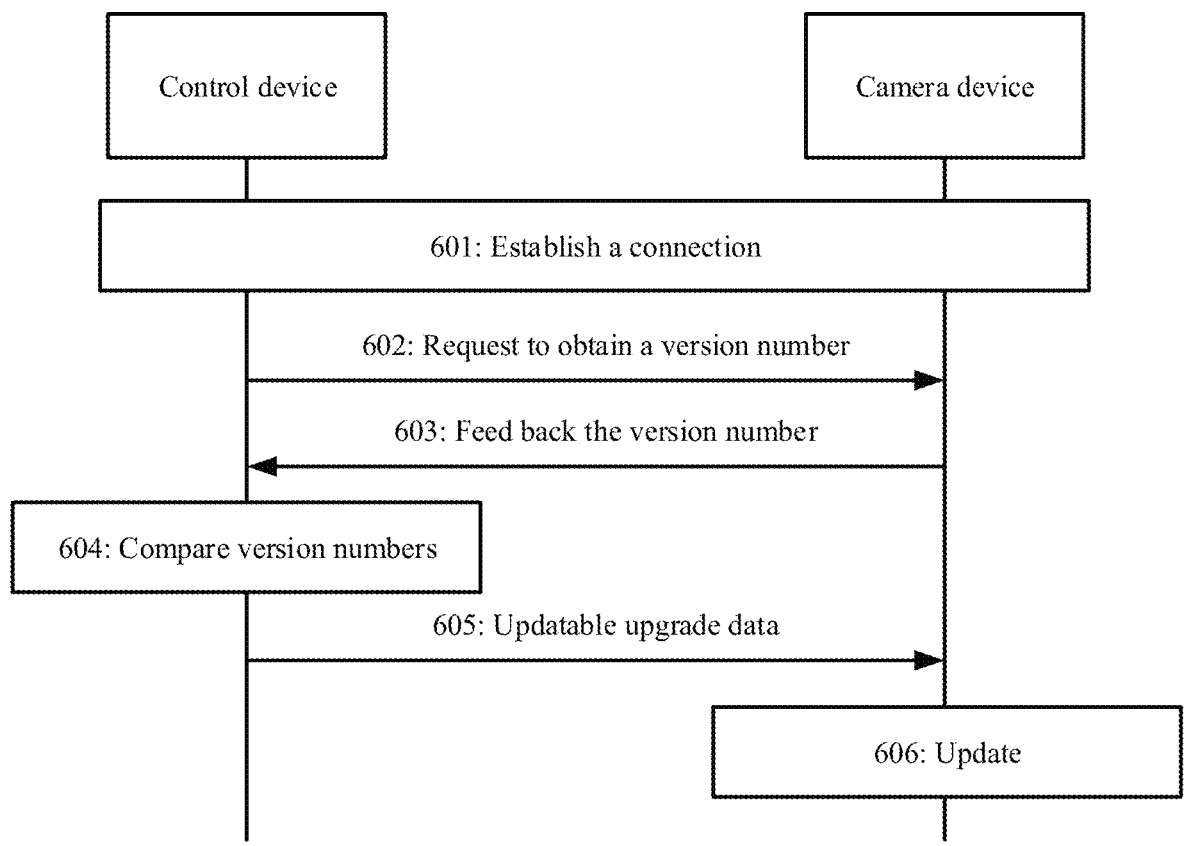
FIG. 6 is a schematic diagram of an upgrade and update process of a camera device according to an embodiment of this application.

Refer to FIG. 6.

601: The control device and the camera device establish a connection.

In this embodiment, a process of establishing a connection between the control device and the camera device may be similar to steps 301 to 306 in the embodiment shown in FIG. 3. Details are not described herein again.

602: The control device obtains a version number of the camera device from the camera device.

In this embodiment, the control device may obtain the version number of the camera device from the camera device through the UVC channel. For example, the version number may be a firmware version number of the camera device, or a version number of software on the camera device. This is not specifically limited herein. In this embodiment, only the firmware version number is used as an example for description.

Specifically, the control device may generate second information to obtain the firmware version number of the camera device. The second information includes a selection parameter, and the selection parameter is set to a second value. The second value indicates the camera device to return the firmware version number of the camera device.

This embodiment is described by using an example in which a structure is used as the second information.

The control device fills in a structure in the kernel, for example, a uvc_xu_control_mapping structure in Linux uvcvideo.h.

The uvc_xu_control_mapping structure may include a plurality of parameters.

An identifier information (identity, ID) parameter, for example, UVC_VC_EXTENSION_UNIT, may be set to a preset value, for example, 0x06, in this embodiment. The value indicates that UVC communication is performed between the control device and the camera device.

An entity parameter is set to a specified GUID.

A selection parameter (selector) indicates a role or a function of the structure. The selection parameter may be set to the second value (for example, 0x02), and indicate to the camera device to return the firmware version number of the camera device.

The control device sets a uvc_xu_control_query structure. In the structure, a unit ID is UVC_QUERY_UNIT=0x11, and query is UVC_GET_CUR. The control device writes an empty array into a structure array (data), and the control device writes the empty array into the kernel by using a UVCIOC_CTRL_QUERY command word.

603: The camera device sends the firmware version number of the camera device to the control device through the UVC channel.

After receiving a notification event through the UVC channel, the camera device generates third information based on the received second information. The third information includes the firmware version number of the camera device.

The camera obtains the unit ID from the received structure. If the unit ID is 0x11, it indicates that the structure is a structure of a UVC extended command. After receiving UVC_GET_CUR, the camera device fills in data, obtains the selection parameter, and determines the value of the selection parameter. If the value is 0x02, the camera device writes the firmware version number into the empty array of the data, to obtain the third information.

After receiving the third information, the control device may use data of the third information as the firmware version number of the camera device.

Figure 7:
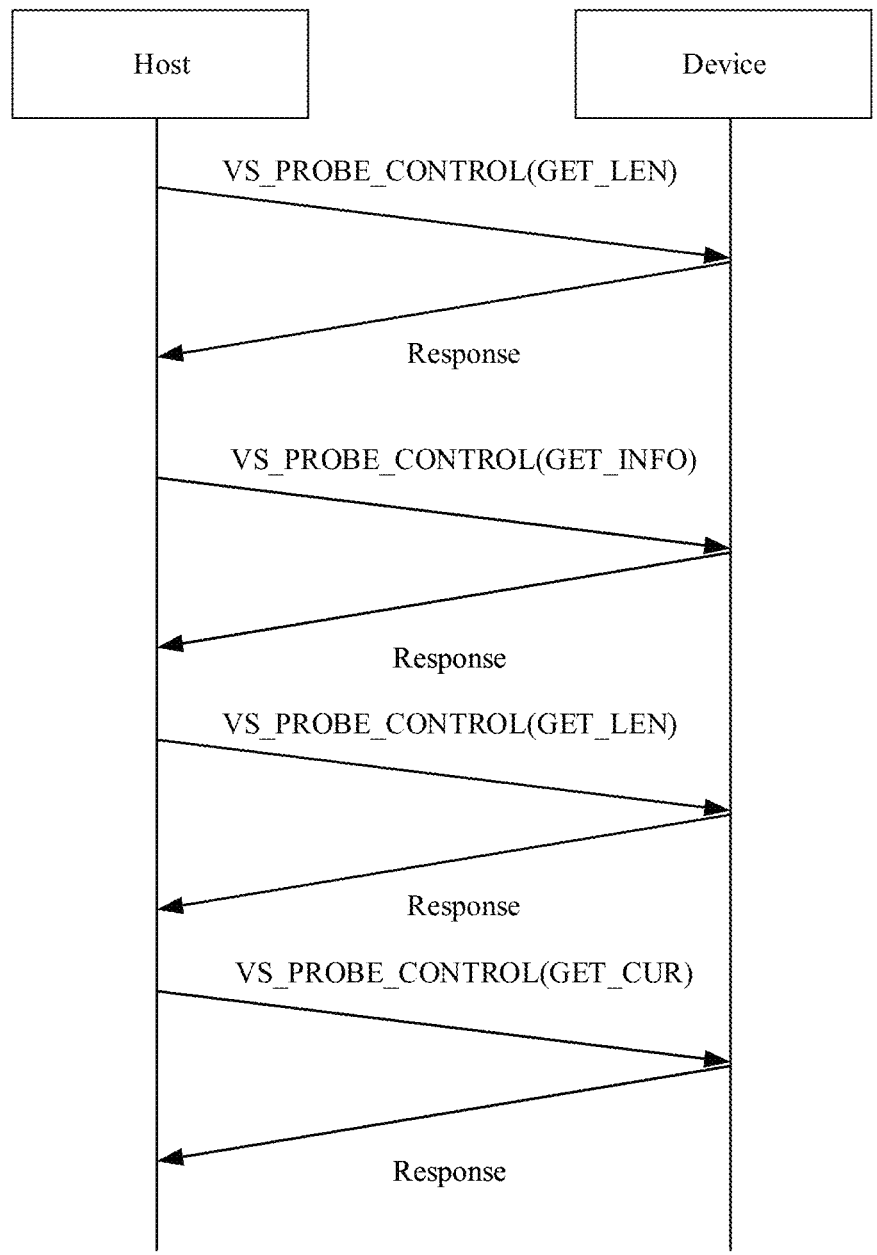
FIG. 7 is a schematic diagram of a process of obtaining a version number of a camera device according to an embodiment of this application.

In this embodiment, a process in which the control device obtains the firmware version number of the camera device may be shown in FIG. 7. A VS_PROBE_CONTROL (GET_LEN) command is to query a length in bytes of a UVC control command, and a VS_PROBE_CONTROL (GET_INFO) command is to query an information bitmap of the UVC control command. The information bitmap is a determining indicator of whether the camera device supports a GET/SET type requirement. The GET type requirement may be any one of the VS_PROBE_CONTROL(GET_INFO) command, the VS_PROBE_CONTROL (GET_LEN) command, the VS_PROBE_CONTROL(GET_CUR) command, or the like. A SET command may be, for example, VS_PROBE_CONTROL(SET_CUR), and RESPONSE is reply information of the camera device based on a command of the control device.

604: The control device compares version numbers.

The control device obtains a latest updatable version number of the camera device, and compares the latest updatable version number with an existing firmware version number of the camera device. If the existing firmware version number is lower, step 605 is performed.

The latest updatable version number of the camera device may be obtained by the control device from the Internet, or may be sent by a user to the control device. This is not specifically limited herein.

605: The camera device receives updatable upgrade firmware from the control device.

If the existing version number of the camera device is lower, the control device sends notification information to the camera device. The notification information indicates the camera device to receive the updatable upgrade firmware, and the upgrade firmware may include an algorithm upgrade package.

After receiving the notification information, the camera device returns acknowledgment information to the control device. The acknowledgment information indicates that the camera device is ready to receive the upgrade firmware and is ready to update the firmware.

After receiving the acknowledgment information, the control device sends update information to the camera device through the TCP/IP channel. The update information includes the updatable upgrade firmware.

After sending the update information, the control device sends a transmission completion instruction to the camera device. The transmission completion instruction instructs the control device to stop sending the update information to the camera device.

606: The camera device updates the firmware.

After receiving the transmission completion instruction, the camera device updates the firmware based on the update information.

After the firmware is updated, the camera device may restart and use the upgrade firmware.

A specific process in which the camera device receives the updatable upgrade firmware and updates the firmware provided in steps 605 and 606 is merely an implementation. It may be understood that in actual running, there may be another specific process. For example, the control device may not send a transmission completion instruction to the camera device, and the camera device directly updates the firmware after receiving the update information. This is not specifically limited herein.

2. The control device replaces an AI algorithm library for the camera device based on the TCP/IP bidirectional transmission channel.

Figure 8:
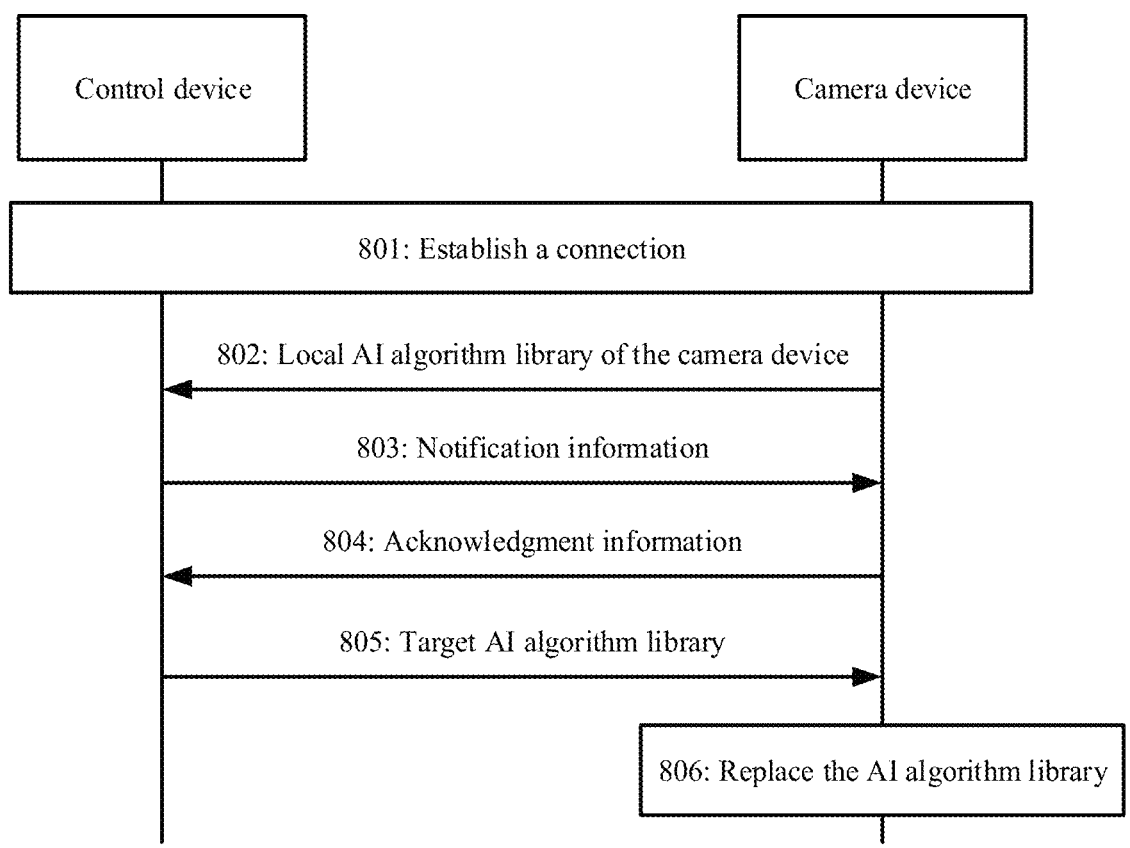
FIG. 8 is a schematic diagram of a process in which a camera device replaces an AI algorithm library according to an embodiment of this application.

Refer to FIG. 8.

801: The control device and the camera device establish a connection.

In this embodiment, a process of establishing a connection between the control device and the camera device may be similar to steps 301 to 306 in the embodiment shown in FIG. 3. Details are not described herein again.

802: The control device obtains a local AI algorithm library of the camera device.

When the local AI algorithm library of the camera device is different from a target AI algorithm library, step 803 is performed. The target AI algorithm library is an AI algorithm library selected by the user. If the local AI algorithm library is different from the target AI algorithm library of the camera device, it indicates that an AI function that can be executed by the camera device is different from an AI function selected by a user.

803: The control device sends notification information to the camera device.

The control device sends the notification information to the camera device. The notification information indicates the camera device to receive the target AI algorithm library.

804: The camera device returns acknowledgment information to the control device.

After receiving the notification information, the camera device returns the acknowledgment information to the control device. The acknowledgment information indicates that the camera device is ready to receive the target AI algorithm library and is ready to replace the AI algorithm library.

805: The camera device receives the target AI algorithm library from the control device.

If the local AI algorithm library of the camera device is different from the target AI algorithm library, the control device sends the target AI algorithm library to the camera device through the TCP/IP channel, so that the camera device has an AI function indicated by the target AI algorithm, that is, the camera device has the AI function selected by the user.

806: The camera device replaces the AI algorithm library.

After sending the target AI algorithm library to the camera device, the control device may send a transmission completion instruction to the camera device. The transmission completion instruction instructs the control device to stop sending the target AI algorithm library to the camera device.

After receiving the transmission completion instruction, the camera device replaces the AI algorithm library. Specifically, the control device may delete the local AI algorithm library, and store the target AI algorithm library, so that the camera device can execute the AI function indicated by the target AI algorithm library, namely, the AI function selected by the user.

A process of replacing the AI algorithm library by the camera device provided in this embodiment is only a specific implementable process. It may be understood that in actual running, there may be another specific implementable process. For example, the control device may not send a transmission completion instruction to the camera device, and the camera device directly adds or replaces the AI function after receiving the target AI algorithm library.

3. The control device calls an AI function of the camera device based on the TCP/IP bidirectional transmission channel.

Figure 9:
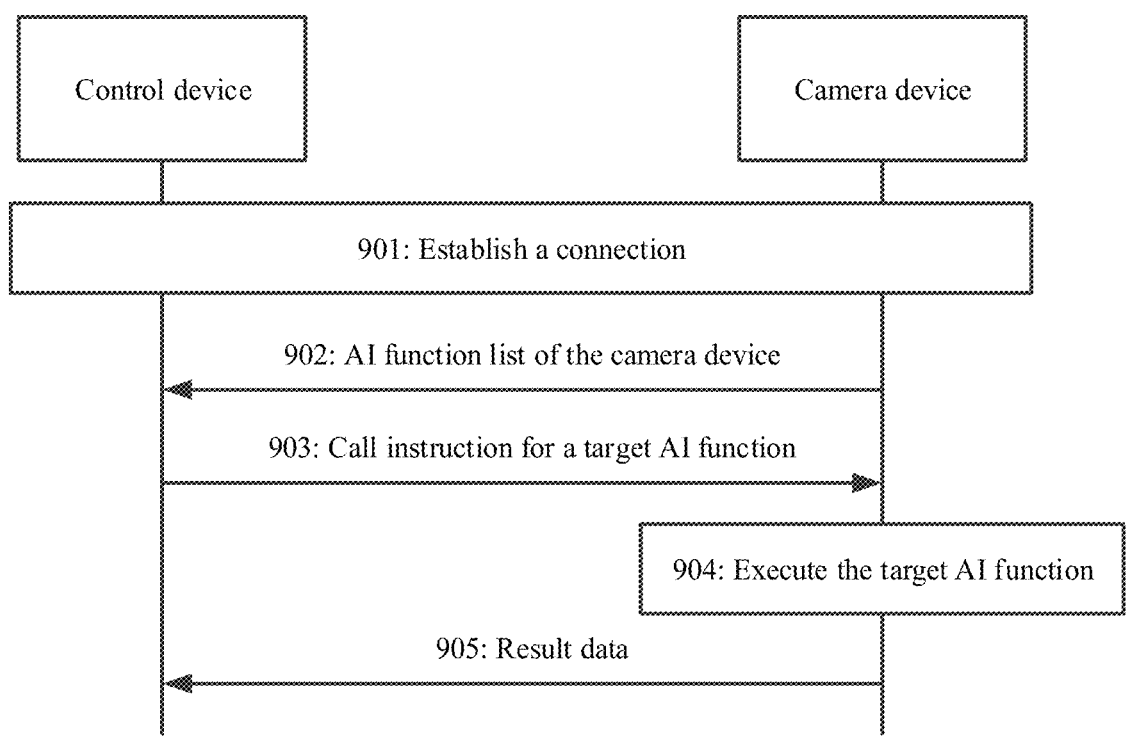
FIG. 9 is a schematic diagram of a process in which a control device calls an AI function of a camera device according to an embodiment of this application.

Refer to FIG. 9.

901: The control device and the camera device establish a connection.

In this embodiment, a process of establishing a connection between the control device and the camera device may be similar to steps 301 to 306 in the embodiment shown in FIG. 3. Details are not described herein again.

902: The control device obtains an AI function list of the camera device.

The camera device sends the AI function list of the camera device to the control device through the TCP/IP channel. The AI function list of the camera device includes an AI function supported by the camera device.

903: The control device sends a call instruction for a target AI function.

The target AI function belongs to an AI function in the AI function list, and the control device may determine the target AI function based on a selection of the user.

904: The camera device executes the target AI function.

After the camera device receives the call instruction sent by the control device, the camera device executes the target AI function instructed by the call instruction, and generates result data.

905: The camera device sends the result data to the control device.

The camera device sends the result data generated in step 904 to the control device through the TCP/IP channel.

4. The control device performs data transmission with the camera device through the TCP/IP bidirectional transmission channel and based on a preset read/write function.

Figure 10:
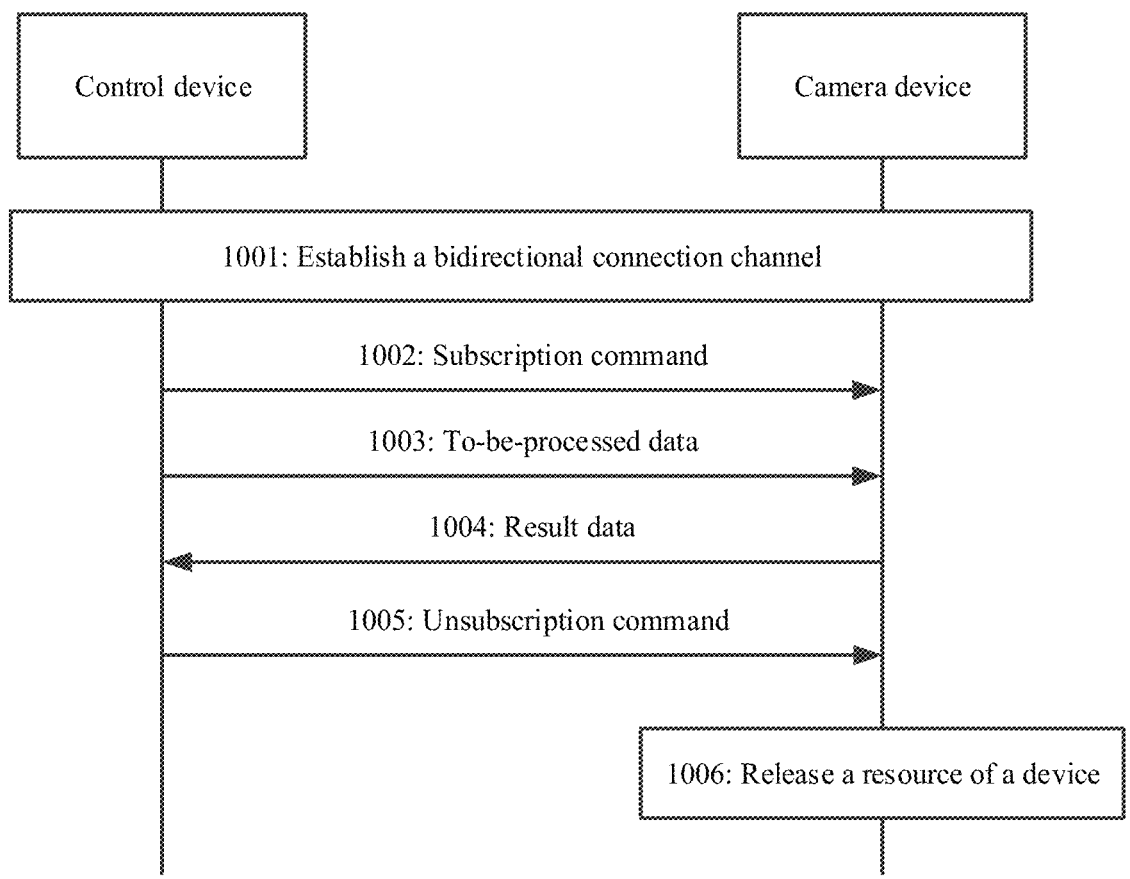
FIG. 10 is a schematic diagram of a process in which a control device and a camera device performs data transmission based on a read/write function according to an embodiment of this application.

Refer to FIG. 10.

1001: The control device and the camera device establish the bidirectional connection channel.

The camera device loads a USB driver, creates a device node, and names the device, for example, a USB AI device. It should be understood that the USB AI device node is created on both the control device and the camera device. Subsequently, the control device and the camera device may create the bidirectional connection channel based on respective USB AI device nodes.

After the control device loads the driver, the camera device is connected to the control device through a USB cable. The kernel of the control device identifies a port at which the device node named as the USB AI device is located, and notifies an upper-layer application of the control device by using an event or in another manner. The control device and the camera device use the camera device by operating the USB AI device node. The device node is enabled by using a preset control command. The control command may be open (/dev/aidevice0, O_RDWR). A camera device is turned on and set to a readable and writable mode. The control device obtains a node number (fd) of the camera device from a value returned by the function.

1002: The control device sends a subscription command to the camera device.

The control device may obtain the AI function of the camera device by using an I/O channel control (ioctl) instruction. An obtaining command may be ioctl(fd, GET_AI_SERVICE, AiServices), where GET_AI_DEVICE is a command code for the control device to read data from the camera device, to obtain the AI function that the camera device can provide from the camera device, and AiServices is a pointer to a structure of the AI function of the camera device that is read.

The control device may select a function to be subscribed to from the AI function of the camera device, and notify, by using the subscription command, the camera device to provide a function indicated by the subscription command. The subscription command may be ioctl(fd, SUBSCRIBE_AI_SERVICE, AiService), where SUBSCRIBE_AI_SERVICE is a command code for the control device to send data to the camera device, to subscribe to an AI service from the camera device, and AiService is a pointer to a structure for the control device to subscribe to the AI service.

1003: The camera device receives to-be-processed data sent by the control device.

The control device sends the to-be-processed data to the camera device through the bidirectional connection channel, and may call write (fd, buffer, size), where fd is a device node ID, buffer is a pointer to a start address of the data that needs to be sent, and size is a quantity of bytes of the data that needs to be sent.

1004: The camera device sends result data to the control device.

After receiving the to-be-processed data sent by the control device, the camera device executes the AI function indicated by the control device, and obtains processed result data. The camera device sends the result data to the control device through the bidirectional connection channel, so that the control device calls the AI function of the camera device.

1005: The control device sends an unsubscription command to the camera device.

If the control device needs to unsubscribe to the subscribed AI function of the camera device, the control device may send the unsubscription command to the camera device to unsubscribe to the AI function. The unsubscription command may be ioctl(fd, UNSUBSCRIBE_AI_SERVICE, AiService), where UNSUBSCRIBE_AI_SERVICE is a command code for the control device to send data to the camera device, to unsubscribe to a specified AI function from the camera device, and AiService is a pointer to a structure for the control device to unsubscribe to the AI function.

1006: The camera device releases a resource of the device.

After the control device stops calling the camera device, the control device may release a resource of the device node created in step 1001, and an application layer of the control device may release the device node by using a call close instruction such as close (int fd).

Figure 11:
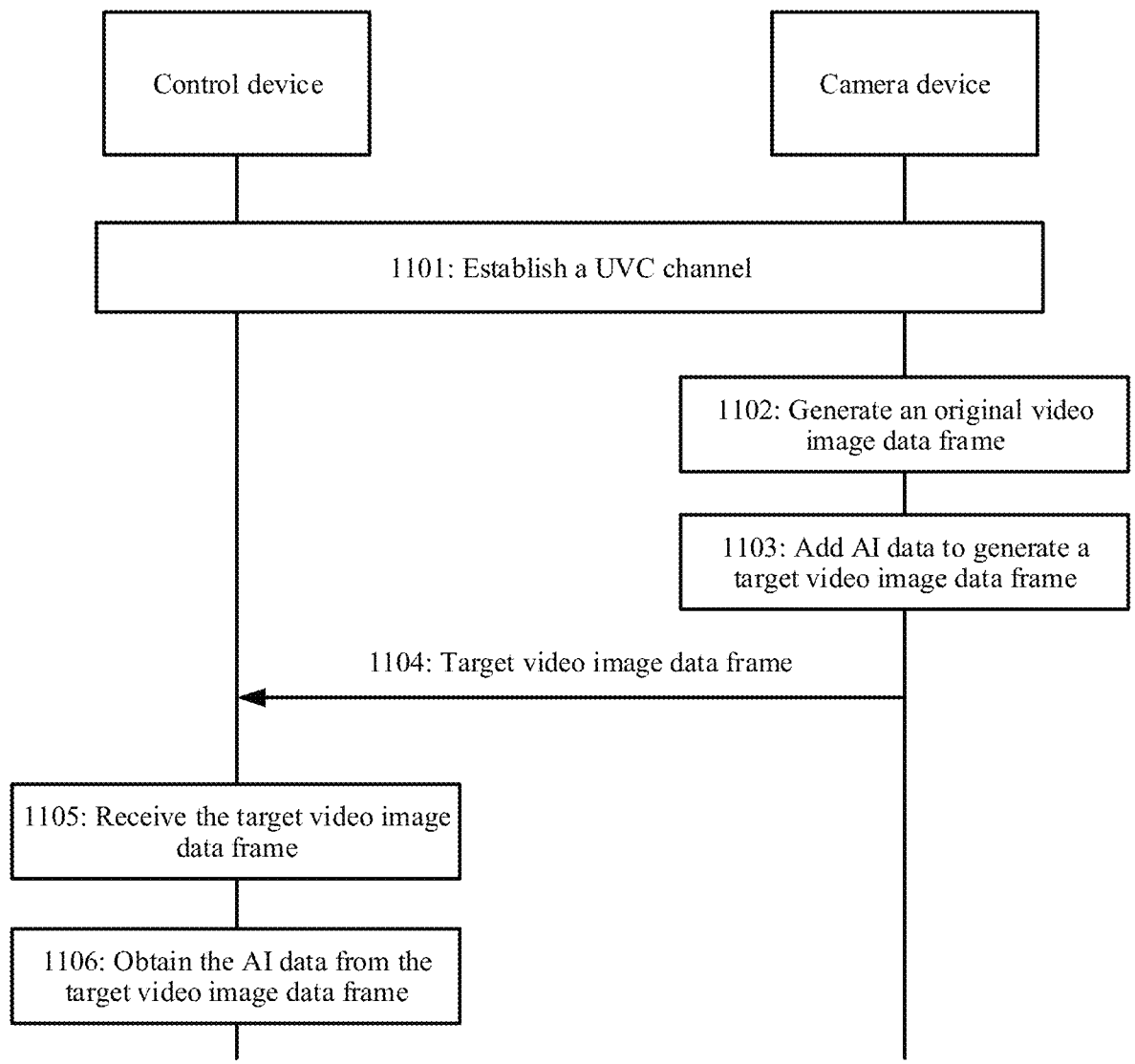
FIG. 11 is another schematic diagram of an information transmission method according to an embodiment of this application.

According to an embodiment of this application, another information transmission method is further provided, and may perform UVC video in-band AI data transmission through a UVC channel, namely, AI data packet transmission by using UVC VideoStream (VS). For details, refer to FIG. 11.

1101: A control device and a camera device establish a UVC channel.

The control device and camera device establish the UVC channel based on the UVC protocol.

1102: The camera device generates an original video image data frame.

In this embodiment, when performing a photography function, the camera device may obtain the original video image data frame.

1103: The camera device adds AI data to the original video image data frame, to obtain a target video image data frame.

After obtaining the original video image data frame, the camera device may add the AI data to each original video image data frame, to obtain the target video image data frame.

In an optional solution, AI data may also be added to some original video image data frames. This is not specifically limited herein. In this embodiment, adding the AI data to the original video image data frame is merely used as an example for description.

In this embodiment, if the target video image data frame is in an encoding format such as H.264 or H.265, the camera device may set a value of a nal_unit_type field of the target video image data frame to a preset value, and set a value of an SEI payload type field of the target video image data frame to indicate a type of the AI data. In addition, the camera device adds the AI data to an SEI payload content field of the target video image data frame.

Figure 12:
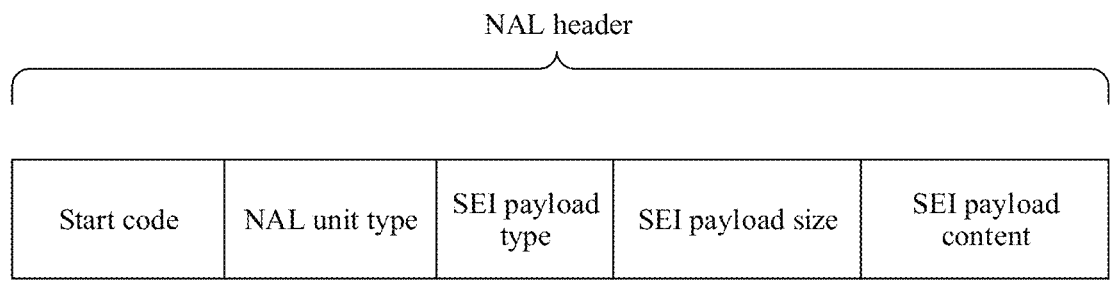
FIG. 12 is a schematic diagram of a structure of a data field in an H.264 encoding format according to an embodiment of this application.

The following uses H.264 as an example for description. Specifically, refer to FIG. 12. FIG. 12 shows a data field structure in the H.264 encoding format. Supplemental enhancement information (SEI) may be selected from an H.264 network abstraction layer (NAL) header structure of the camera device, nal_unit_type=0x06 is specified, and the SEI payload type is specified as a type of private AI data. An SEI payload size is set to indicate a payload length in bytes. The AI data is written into the SEI payload content field.

1104: The camera device sends the target video image data frame to the control device through the UVC channel.

After generating the target video image data frame, the camera device sends the target video image data frame to the control device through the UVC channel.

1105: The control device receives the target video image data frame through the UVC channel.

The control device may receive, through the UVC channel, the target video image data frame sent by the camera device. The target video image data frame includes the AI data corresponding to the target video image data frame.

1106: The control device obtains the AI data from the target video image data frame.

In this embodiment, if the target video image data frame is in the H.264 encoding format, the control device may first determine that the value of the nal_unit_type field of the target video image data frame is the preset value. If the value of the nal_unit_type field of the target video image data frame is the preset value, it indicates that an NAL object is of an SEI type, and the control device may continue to determine whether the value of the SEI payload type field of the target video image data frame indicates a type of the AI data. If the value of the SEI payload type field of the target video image data frame indicates a type of the AI data, it indicates that the target video image data frame includes the AI data, and the control device may obtain the AI data from the SEI payload content field of the target video image data frame.

Specifically, also refer to FIG. 12. After the control device receives the target video image data frame, a decoder of the control device may determine, based on that nal_unit_type of an NAL header is 0x06, that the NAL object is of the SEI type.

Then, different functions are called based on the SEI payload type. For the type of private AI data, the decoder of the control device uploads the data to an upper-layer service layer of the control device.

After the upper-layer service layer reads that nal_unit_type is of the SEI type, if the payload type indicates a type of the AI data, the AI data may be extracted from the NAL object based on the payload size.

In this embodiment, the AI data may be transmitted in the target video image data frame through the UVC channel. This increases diversity and flexibility of data transmission.

Embodiments of this application may be applied to fields such as industrial production, logistics, and/or industrial robot. The following briefly describes application scenarios in the fields by using examples.

In the industrial production scenario, a camera device monitors a production line, feeds video data back to a control device through a UVC channel, and reports target information identified by an AI algorithm to the control device through a bidirectional communication channel.

In the industrial robot scenario, an industrial robot serves as a control device and is connected to a camera device through a USB interface. When obtaining a video image, the camera device can also obtain a real-time AI processing result through a bidirectional communication channel. The industrial robot performs a subsequent operation based on AI data returned by the camera device.

In the logistics field, a camera device may be configured to monitor transmission of a package. The camera device identifies, by using an AI algorithm, whether the package is damaged, lost, or the like, and returns a monitoring result to a control device through a bidirectional transmission channel. The control device provides a warning in a package transmission process based on the monitoring result, and may further calculate a volume of the package by using an AI function of the camera device. The control device may effectively arrange package transportation based on the volume of the package.

It may be understood that the foregoing examples are merely some actual application scenarios of embodiments of this application. There may be more application scenarios during actual application. For example, the camera device in embodiments of this application provides a plurality of USB driver ports. A USB audio class (UAC) port and a UVC port may be virtualized based on a USB physical port by using a driver, so that audio is collected by using a microphone of the camera device, and real-time synchronous collection of video and the audio is implemented through one USB physical port.

Alternatively, a UAC port and a virtual network port may be virtualized based on the USB physical port by using a driver. A bidirectional transmission channel is established between an audio device and the control device. Audio data is processed in real time by using an AI algorithm on the audio device, and an audio processing result is transmitted to the control device through the bidirectional transmission channel.

Alternatively, a UAC port, a UVC port, and a virtual network port may be virtualized based on the USB physical port by using a driver, to implement combination of the three ports.

The foregoing describes the information transmission method in embodiments of this application. The following describes a structure of a control device and a structure of a camera device in an embodiment of this application.

Figure 13:
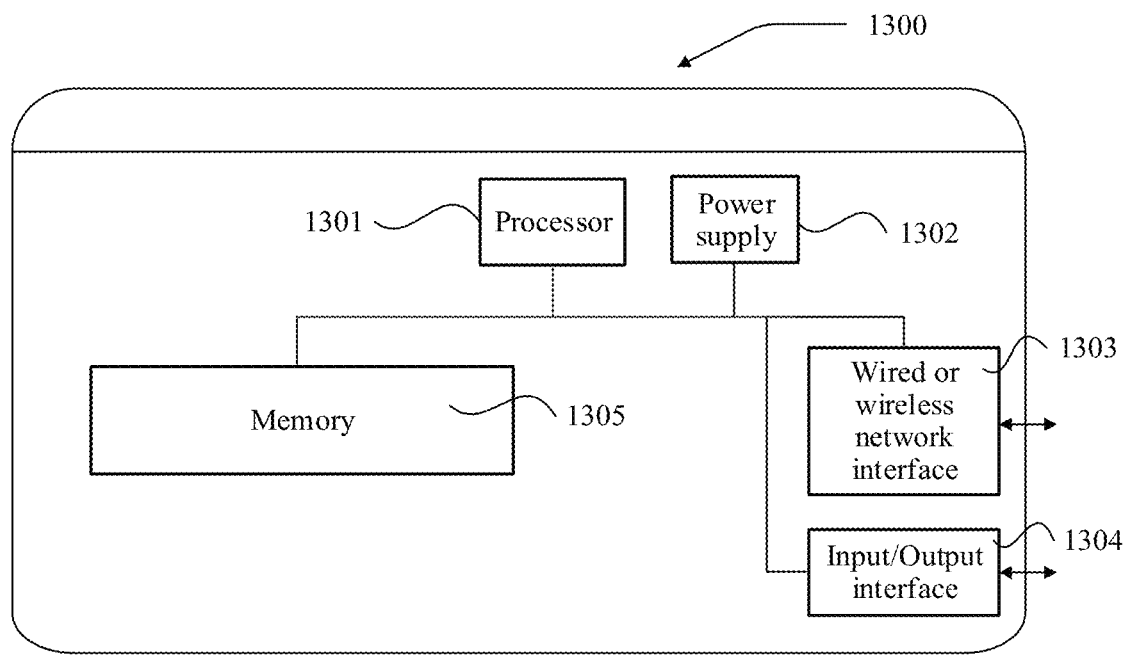
FIG. 13 is a schematic diagram of a structure of a control device according to an embodiment of this application.

Refer to FIG. 13. An embodiment of this application provides a control device 1300. The control device 1300 may include one or more processors 1301 and a memory 1305. The memory 1305 stores program code. Further, the memory 1305 may further store data.

The memory 1305 may be a volatile memory, a nonvolatile memory, or a persistent storage device. The program code stored in the memory 1305 may include one or more modules, and each module may include a series of instruction operations for the control device. Further, the processor 1301 may be configured to communicate with the memory 1305, and execute, on the control device 1300, the series of instruction operations in the memory 1305.

The control device 1300 may further include one or more power supplies 1302, one or more wired or wireless network interfaces 1303, one or more input/output interfaces 1304, and/or one or more operating systems such as Windows, Android, macOS, iOS, Unix, Linux and FreeBSD operating systems.

The processor 1301 may perform the operations performed by the control device in the embodiments shown in FIG. 3, FIG. 6, and FIG. 8 to FIG. 11. Details are not described herein again.

Figure 14:
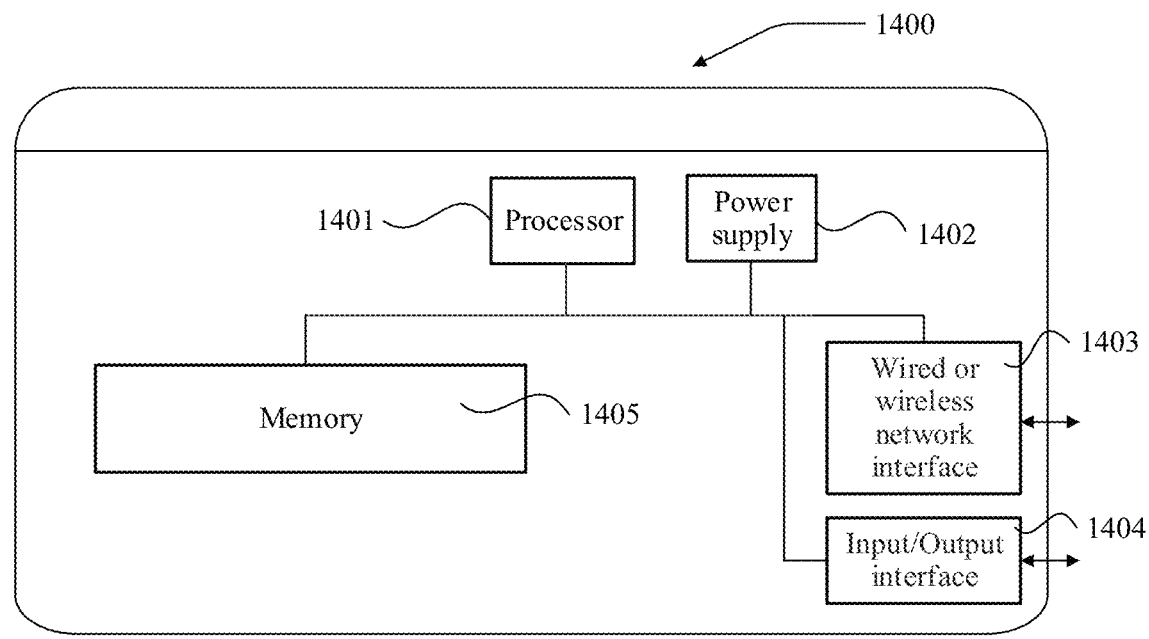
FIG. 14 is a schematic diagram of a structure of a camera device according to an embodiment of this application.

Refer to FIG. 14. An embodiment of this application provides a camera device 1400. The camera device 1400 may include one or more processors 1401 and a memory 1405. The memory 1405 stores program code. Further, the memory 1405 may further store data.

The memory 1405 may be a volatile memory, a nonvolatile memory, or a persistent storage device. The program code stored in the memory 1405 may include one or more modules, and each module may include a series of instruction operations for the camera device. Further, the processor 1401 may be configured to communicate with the memory 1405, and execute, on the camera device 1400, the series of instruction operations in the memory 1405.

The camera device 1400 may further include one or more power supplies 1402, one or more wired or wireless network interfaces 1403, one or more input/output interfaces 1404, and/or one or more operating systems such as Windows, Android, macOS, iOS, Unix, Linux and FreeBSD operating systems.

The processor 1401 may perform the operations performed by the camera device in the embodiments shown in FIG. 3, FIG. 6, and FIG. 8 to FIG. 11. Details are not described herein again.

Figure 15:
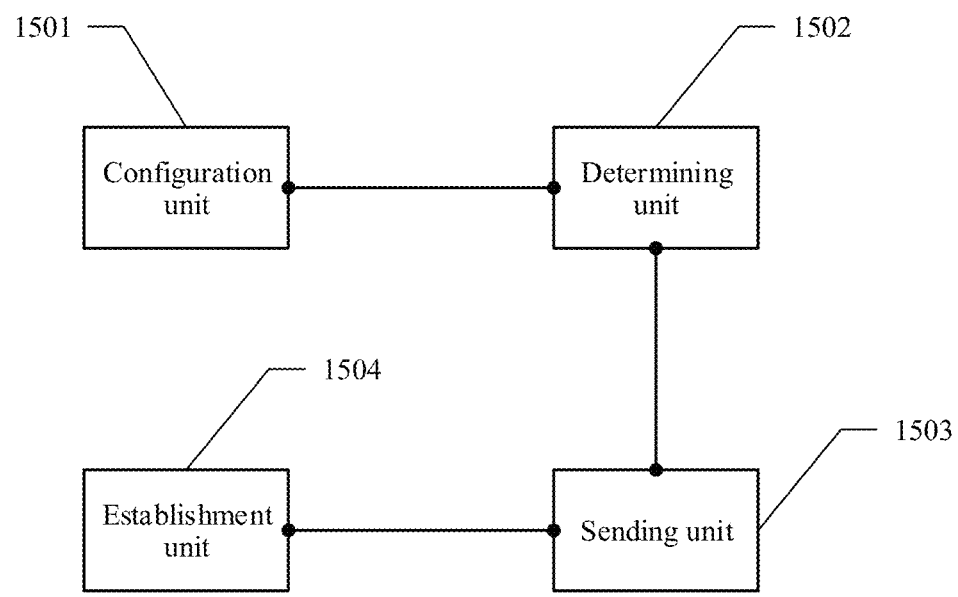
FIG. 15 is a schematic diagram of another structure of a control device according to an embodiment of this application.

Refer to FIG. 15. An embodiment of this application provides a control device. The control device includes:
a configuration unit 1501, configured to obtain a second UVC port and a second virtual network port based on configuration of a universal serial bus USB port of the control device;
a determining unit 1502, configured to determine address information of a camera device, where a first UVC port and a first virtual network port are configured on the camera device, and the first UVC port and the first virtual network port are obtained based on configuration of a USB port of the camera device;
a sending unit 1503, configured to send the address information to the camera device through a UVC channel, where the UVC channel is established based on the first UVC port and the second UVC port; and
an establishment unit 1504, configured to establish, with the camera device, a bidirectional transmission channel based on the first virtual network port, the second virtual network port, and the address information.

In this embodiment, units in the control device may perform the operations performed by the control device in the embodiments shown in FIG. 3, FIG. 6, and FIG. 8 to FIG. 11. Details are not described herein again.

Figure 16:
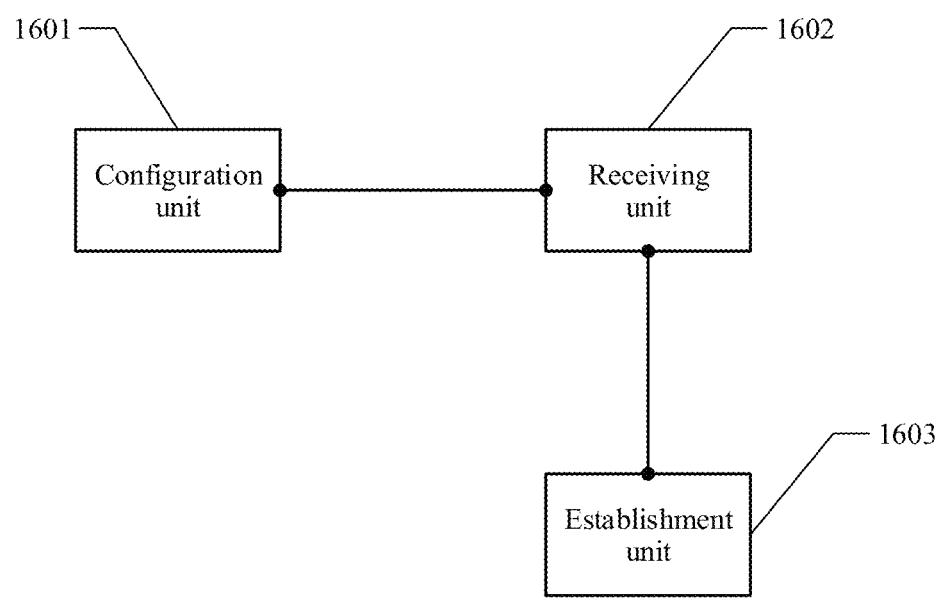
FIG. 16 is a schematic diagram of another structure of a camera device according to an embodiment of this application.

Refer to FIG. 16. An embodiment of this application provides a camera device. The camera device includes:
a configuration unit 1601, configured to obtain a first UVC port and a first virtual network port based on configuration of a USB port of the camera device;
a receiving unit 1602, configured to receive, through a UVC channel, address information sent by a control device, where the UVC channel is established based on the first UVC port and a second UVC port, the second UVC port and a second virtual network port are configured on the control device, and the second UVC port and the second virtual network port are obtained based on configuration of a USB port of the control device; and
an establishment unit 1603, configured to establish, with the control device, a bidirectional transmission channel based on the first virtual network port, the second virtual network port, and the address information.

In this embodiment, units in the camera device may perform the operations performed by the camera device in the embodiments shown in FIG. 3, FIG. 6, and FIG. 8 to FIG. 11. Details are not described herein again.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, in other words, may be located in one position, or may be distributed on a plurality of network units. Some or all of the units may be selected based on actual requirements to achieve objectives of solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, technical solutions of this application essentially, or a part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. An information transmission method, wherein the method comprises:
    obtaining, by a control device, a first universal serial bus video class (UVC) port and a first virtual network port based on a configuration of a universal serial bus (USB) port of the control device;
    determining, by the control device, address information of a camera device, wherein a second UVC port and a second virtual network port are configured on the camera device, and the second UVC port and the second virtual network port are obtained based on a configuration of a USB port of the camera device;
    sending, by the control device, the address information to the camera device through a UVC channel, wherein the UVC channel is established based on the first UVC port and the second UVC port; and
    establishing, by the control device and the camera device, a bidirectional transmission channel based on the first virtual network port, the second virtual network port, and the address information.

2. The method according to claim 1, wherein obtaining, by the control device, the first UVC port and a first virtual network port comprises:
    setting, by the control device, a kernel parameter for the USB port, to extend the USB port to the first UVC port and the first virtual network port.

3. The method according to claim 2, wherein setting, by the control device, the kernel parameter for the USB port comprises:
    setting, by the control device, CONFIG_USB_USBNET, CONFIG_USB_NET_CDCETHER, and CONFIG_USB_NET_RNDIS_HOST to "enabled".

4. The method according to claim 1, wherein before sending, by the control device, the address information to the camera device through the UVC channel, the method further comprises:
    generating, by the control device, first information, wherein the first information comprises the address information and a selection parameter, the selection parameter is set to a first value, and the first value indicates that the first information comprises the address information; and
    sending, by the control device, the address information to the camera device through the UVC channel comprises:
    sending, by the control device, the first information to the camera device through the UVC channel.

5. The method according to claim 1, wherein the method further comprises:
    obtaining, by the control device, a version number of the camera device from the camera device through the UVC channel; and
    after establishing, by the control device and the camera device, the bidirectional transmission channel, the method further comprises:
    if the version number is lower than an updatable version number, sending, by the control device, updatable upgrade data to the camera device through the bidirectional transmission channel, wherein the updatable upgrade data is used to upgrade and update on the camera device.

6. The method according to claim 5, wherein before obtaining, by the control device, the version number of the camera device, the method further comprises generating, by the control device, second information, wherein the second information comprises a selection parameter set to a first value that indicates to the camera device to return the version number of the camera device; and
    obtaining, by the control device, the version number of the camera device from the camera device through the UVC channel comprises receiving, by the control device through the UVC channel, third information sent by the camera device, wherein the third information comprises the version number of the camera device.

7. The method according to claim 1, wherein the method further comprises:
    determining, by the control device, a target artificial intelligence AI algorithm library; and
    after establishing, by the control device and the camera device, the bidirectional transmission channel, the method further comprises:
    if the target AI algorithm library is different from a local AI algorithm library of the camera device, sending, by the control device, the target AI algorithm library to the camera device through the bidirectional transmission channel, wherein the target AI algorithm library is used by the camera device to update the local AI algorithm library.

8. The method according to claim 1, wherein the method further comprises:
    determining, by the control device, a target AI function that needs to be called, wherein the target AI function belongs to an AI function released by the camera device; and
    after establishing, by the control device and the camera device, the bidirectional transmission channel, the method further comprises:

sending, by the control device, a call instruction for the target AI function to the camera device through the bidirectional transmission channel; and receiving, by the control device through the bidirectional transmission channel, result data sent by the camera device, wherein the result data is data generated after the camera device executes the target AI function.

9. The method according to claim 1, wherein the address information is Internet protocol IP address information, the second virtual network port is a first remote network driver interface specification RNDIS port, the first virtual network port is a second RNDIS port, and the bidirectional transmission channel is a transmission control protocol/Internet protocol TCP/IP bidirectional transmission channel.

10. The method according to claim 9, wherein determining, by the control device, address information of the camera device comprises:

assigning, by the control device, the IP address information to the camera device by using a dynamic host configuration protocol DHCP, wherein the IP address information and IP address information of the control device belong to a same address segment.

11. The method according to claim 1, wherein obtaining, by the control device, the second UVC port and the second virtual network port comprises:

modifying, by the control device, a driver of the control device, and declaring, on the control device, the USB port as a USB AI device, to extend the USB port to the first UVC port and a port for the USB AI device; and after establishing, by the control device and the camera device, the bidirectional transmission channel, the method further comprises:

performing, by the control device, data transmission with the USB AI device through the bidirectional transmission channel and based on a preset read/write function.

12. The method according to claim 1, wherein the method further comprises:

receiving, by the control device through the UVC channel, a target video image data frame sent by the camera device, wherein the target video image data frame carries AI data corresponding to the target video image data frame; and obtaining, by the control device, the AI data from the target video image data frame.

13. The method according to claim 12, wherein that the target video image data frame carries AI data corresponding to the target video image data frame comprises:

the target video image data frame comprises a payload data type field and a payload data content field, and when the payload data type field indicates a type of the AI data, the payload data content field carries the AI data corresponding to the target video image data frame.

14. The method according to claim 12, wherein obtaining, by the control device, the AI data from the target video image data frame comprises:

when a value of a nal_unit_type field of the target video image data frame is a preset value, determining, by the control device, whether a value of an SEI payload type field of the target video image data frame indicates a type of the AI data; and if the value of the SEI payload type field of the target video image data frame indicates the type of the AI data, obtaining, by the control device, the AI data from the SEI payload content field of the target video image data frame.

15. The method according to claim 1, wherein a Windows operating system is used in the control device, and the USB port of the camera device is configured such that the second virtual network port occupies an interface of the USB port before the second UVC port occupies the interface of the USB port.

16. A control device, comprising:

a configuration unit, configured to obtain a first universal serial bus video class (UVC) port and a first virtual network port based on a configuration of a universal serial bus (USB) port of the control device;

a determining unit, configured to determine address information of a camera device, where a second UVC port and a second virtual network port are configured on the camera device, and the second UVC port and the second virtual network port are obtained based on configuration of a USB port of the camera device;

a sending unit, configured to send the address information to the camera device through a UVC channel established based on the first UVC port and the second UVC port; and an establishment unit, configured to establish, with the camera device, a bidirectional transmission channel based on the first virtual network port, the second virtual network port, and the address information.

17. The control device according to claim 16, wherein the configuration unit is configured to obtain the second UVC port and the second virtual network port based on the configuration of the USB port of the control device by:

setting a kernel parameter for the USB port, to extend the USB port to the second UVC port and the second virtual network port.

18. The control device according to claim 16, wherein the sending unit is configured to, before sending the address information to the camera device through the UVC channel:

generate first information comprising the address information and a selection parameter, wherein the selection parameter is set to a first value that indicates that the first information comprises the address information; and send the address information to the camera device through the UVC channel by:

sending the first information to the camera device through the UVC channel.

19. A camera, comprising:

a configuration unit, configured to obtain a first universal serial bus video class (UVC) port and a first virtual network port based on a configuration of a universal serial bus (USB) port of the camera device;

a receiving unit, configured to receive, through a UVC channel, address information sent by a control device, where the UVC channel is established based on the first UVC port and a second UVC port, the second UVC port and a second virtual network port are configured on the control device, and the second UVC port and the second virtual network port are obtained based on a configuration of a USB port of the control device; and an establishment unit, configured to establish, with the control device, a bidirectional transmission channel based on the first virtual network port, the second virtual network port, and the address information.

20. The camera of claim 19, wherein the camera device obtains the first UVC port and the first virtual network port based on the configuration of the USB port of the camera device by modifying a driver of the USB port to extend the USB port to the first UVC port and the first virtual network port.

\* \* \* \* \*